US012724318B2

(12) United States Patent
Watanabe et al.

(10) Patent No.: US 12,724,318 B2
(45) Date of Patent: Sep. 1, 2026

(54) OPTICAL PULSE TRAIN GENERATION DEVICE AND OPTICAL PULSE TRAIN GENERATION METHOD

(71) Applicant: HAMAMATSU PHOTONICS K.K., Hamamatsu (JP)

(72) Inventors: Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 255 days.

(21) Appl. No.: 18/637,686

(22) Filed: Apr. 17, 2024

(65) Prior Publication Data

US 2024/0361664 A1 Oct. 31, 2024

(30) Foreign Application Priority Data

Apr. 28, 2023 (JP) ................................ 2023-074839

(51) Int. Cl.
*G02F 1/35* (2006.01)

(52) U.S. Cl.
CPC ............ *G02F 1/353* (2013.01); *G02F 1/3501* (2013.01); *G02F 2203/12* (2013.01); *G02F 2203/26* (2013.01); *G02F 2203/54* (2013.01)

(58) Field of Classification Search
CPC .... G02F 1/3501; G02F 1/353; G02F 2203/12; G02F 2203/26; G02F 2203/54
See application file for complete search history.

(56) References Cited

U.S. PATENT DOCUMENTS 8,223,298 B2 * 7/2012 Thornes ................ H01S 3/0057 349/83
2008/0309931 A1 12/2008 Silberberg et al.
(Continued)

FOREIGN PATENT DOCUMENTS

CN 115268200 A 11/2022
JP 2018-036486 A 3/2018
(Continued)

OTHER PUBLICATIONS

Hacker, M. et al., "Iterative Fourier transform algorithm for phase-only pulse shaping," Optics Express, vol. 9, No. 4, pp. 191-199, Aug. 13, 2001.
(Continued)

*Primary Examiner* — Daniel Petkovsek
(74) *Attorney, Agent, or Firm* — Faegre Drinker Biddle & Reath LLP

(57) ABSTRACT

An optical pulse train generation device includes a storage unit and a characteristic setting unit. The storage unit stores a plurality of phase patterns in advance. The plurality of phase patterns are phase patterns for forming, from a first optical pulse, an optical pulse train including a plurality of second optical pulses having time differences therebetween and having different center wavelengths. Between the plurality of phase patterns, one or both of a first characteristic regarding the first optical pulse and a second characteristic regarding the optical pulse train are different. The characteristic setting unit sets the first characteristic and the second characteristic in response to the user's input. The storage unit stores the plurality of phase patterns in association with the first characteristic and the second characteristic. A spatial light modulator displays a phase pattern corresponding to the first characteristic and the second characteristic set by the characteristic setting unit.

15 Claims, 30 Drawing Sheets

(56) References Cited

U.S. PATENT DOCUMENTS

| | | | | |
|---|---|---|---|---|
| 2019/0258206 | A1* | 8/2019 | Takahashi | G03H 1/0005 |
| 2022/0178752 | A1* | 6/2022 | Watanabe | G01J 3/453 |

FOREIGN PATENT DOCUMENTS

| | | | |
|---|---|---|---|
| JP | 2021-536133 | A | 12/2021 |
| JP | 2022-180146 | A | 12/2022 |
| WO | 2020/051339 | A1 | 3/2020 |

OTHER PUBLICATIONS

Ripoll, Olivier, et al., "Review of iterative Fourier-transform algorithms for beam shaping applications," Optical Engineering, vol. 43, No. 11, pp. 2549-2556, Nov. 2004.

* cited by examiner 1
20
22
SPECTROGRAM SETTING UNIT
23
PHASE PATTERN GENERATION UNIT
24
STORAGE UNIT
INPUT UNIT
CHARACTERISTIC SETTING UNIT
PRESENTATION UNIT
26
27
28
SC
14
2
3
Pa
Pb WAVELENGTH
WAVELENGTH
Pb1(Pb)
Pb2(Pb)
Pb3(Pb)
INTENSITY
TIME Pb2
Pb
Pb1
Pb3
INTENSITY
TIME WAVELENGTH
WAVELENGTH
Pd1(Pd)
Pd2(Pd)
Pd3(Pd)
INTENSITY
TIME Pd2
Pd
Pd1
Pd3
INTENSITY
TIME

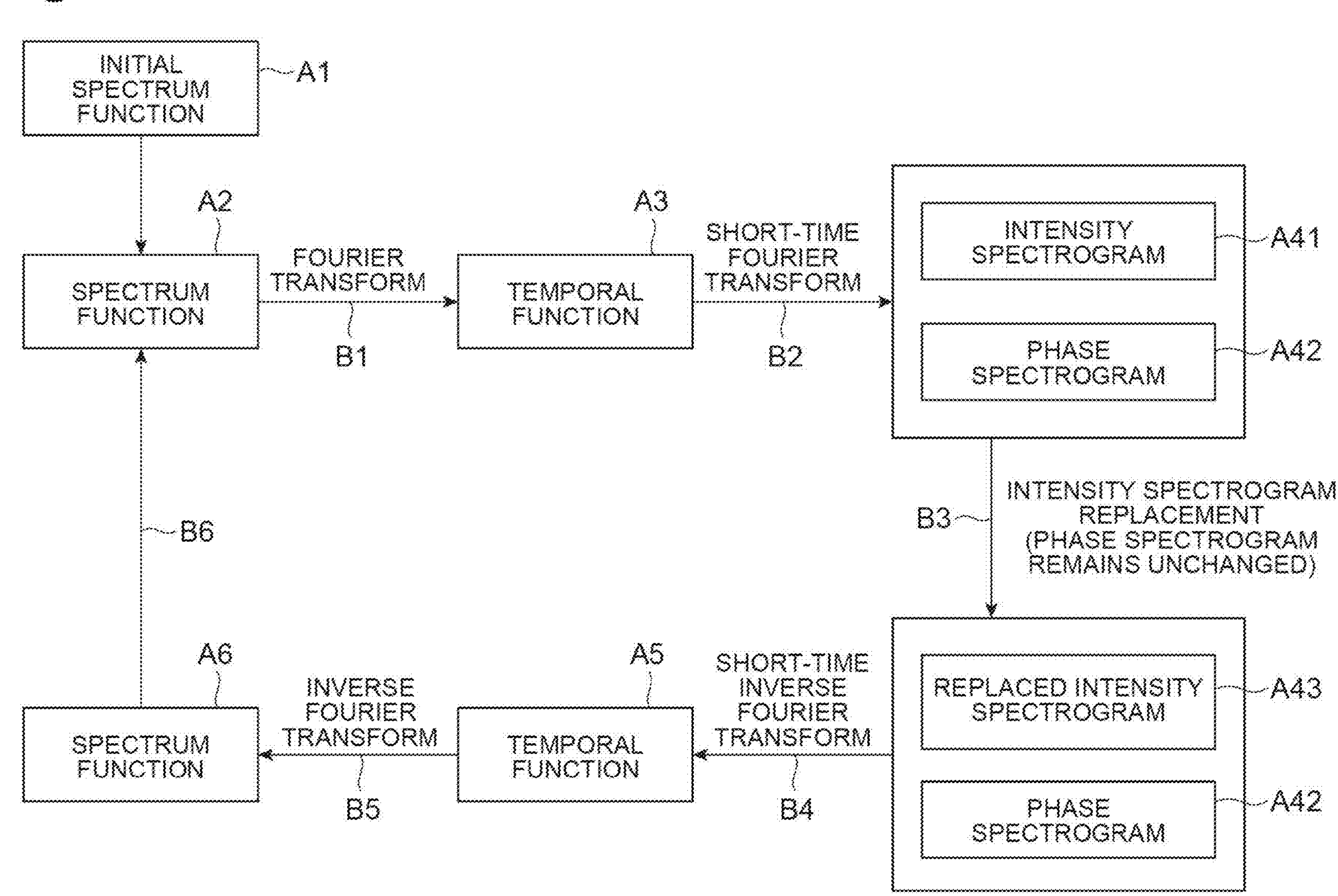
Fig.11
INITIAL SPECTRUM FUNCTION
A1
SPECTRUM FUNCTION
A2
FOURIER TRANSFORM
B1
TEMPORAL FUNCTION
A3
SHORT-TIME FOURIER TRANSFORM
B2
INTENSITY SPECTROGRAM
A41
PHASE SPECTROGRAM
A42
INTENSITY SPECTROGRAM REPLACEMENT (PHASE SPECTROGRAM REMAINS UNCHANGED)
B3
REPLACED INTENSITY SPECTROGRAM
A43
PHASE SPECTROGRAM
A42
SHORT-TIME INVERSE FOURIER TRANSFORM
B4
TEMPORAL FUNCTION
A5
INVERSE FOURIER TRANSFORM
B5
SPECTRUM FUNCTION
A6
B6

Figure 12:
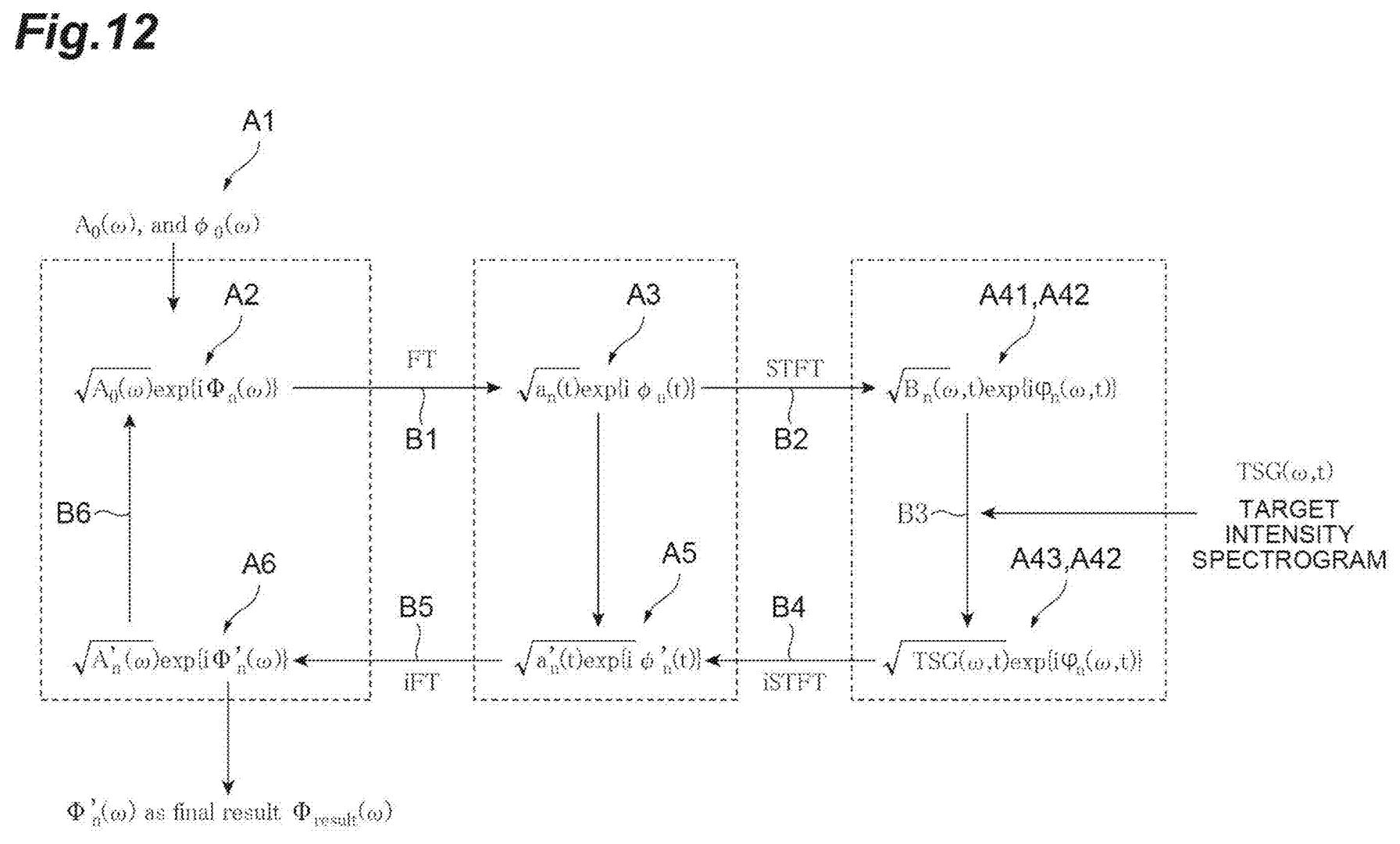

$A_0(\omega)$, and $\phi_0(\omega)$

A2

$\sqrt{A_0(\omega)}\exp\{i\Phi_n(\omega)\}$

FT

B1

A3

$\sqrt{a_n(t)}\exp\{i\phi_n(t)\}$

STFT

B2

A41,A42

$\sqrt{B_n(\omega,t)}\exp\{i\varphi_n(\omega,t)\}$

TSG($\omega$,t)

TARGET INTENSITY SPECTROGRAM

B3

A43,A42

$\sqrt{TSG(\omega,t)}\exp\{i\varphi_n(\omega,t)\}$

B4 iSTFT

A5

$\sqrt{a'_n(t)}\exp\{i\phi'_n(t)\}$

B5 iFT

A6

$\sqrt{A'_n(\omega)}\exp\{i\Phi'_n(\omega)\}$

B6

$\Phi'_n(\omega)$ as final result $\Phi_{result}(\omega)$

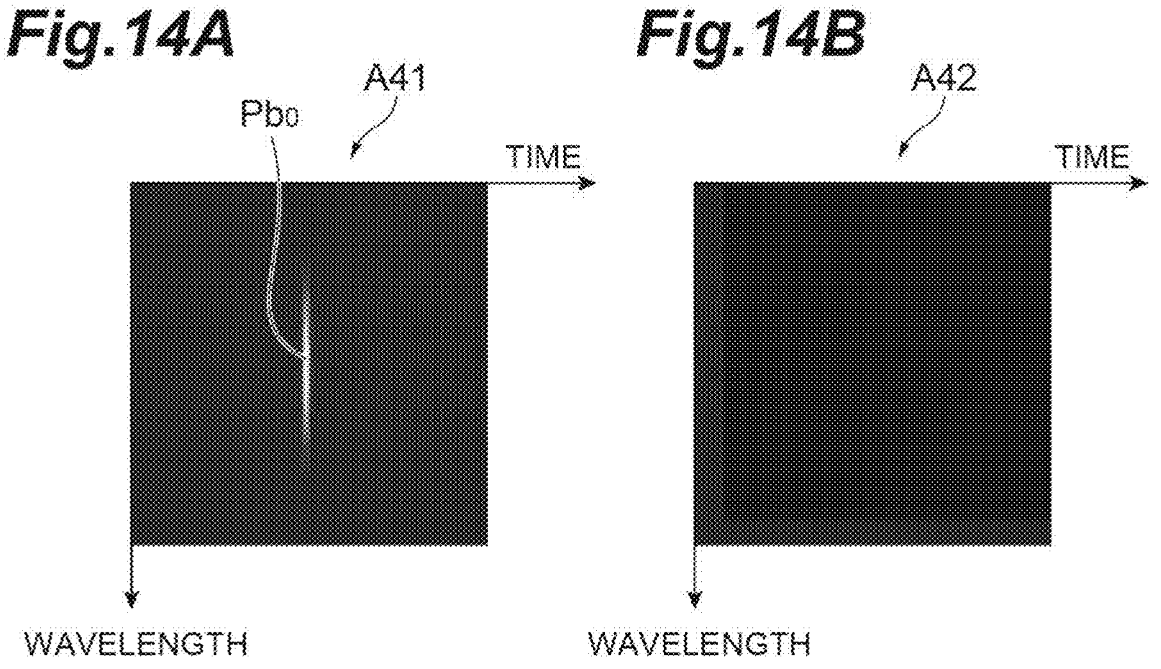
Fig.14A
A41
Pb0
TIME
WAVELENGTH
Fig.14B
A42
TIME
WAVELENGTH
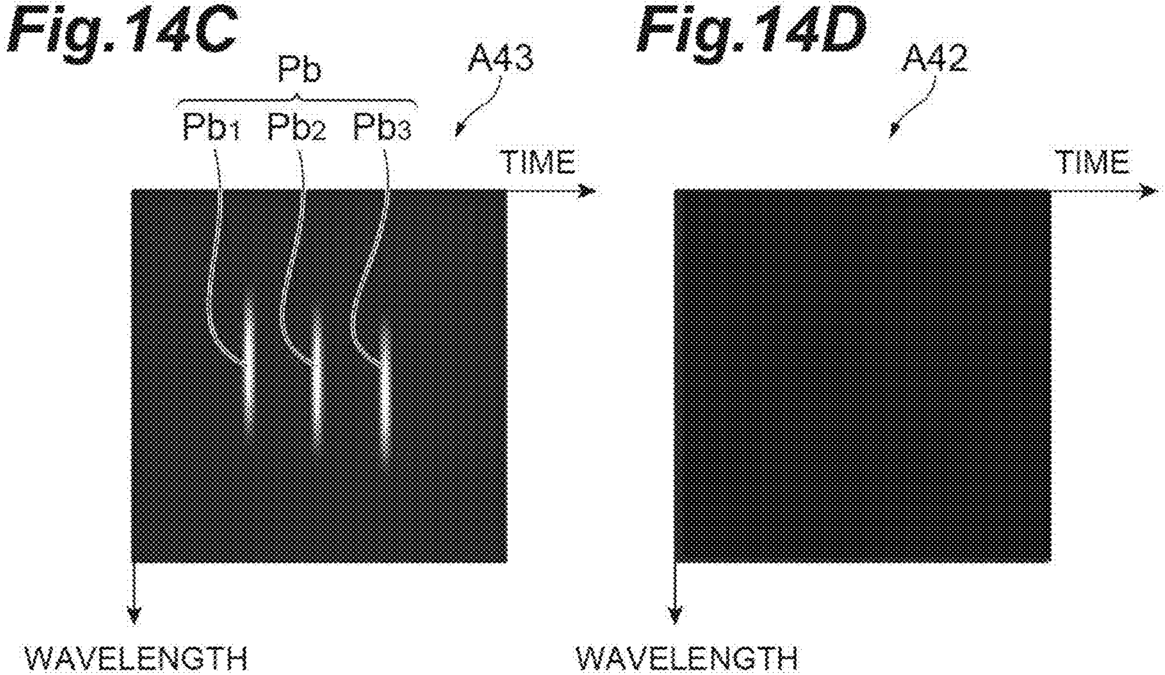
Fig.14C
Pb
A43
Pb1
Pb2
Pb3
TIME
WAVELENGTH
Fig.14D
A42
TIME
WAVELENGTH Pb
Pb1 Pb2 Pb3
A41
TIME
WAVELENGTH

A42
TIME
WAVELENGTH

Pb
Pb1 Pb2 Pb3
A43
TIME
WAVELENGTH

A42
TIME
WAVELENGTH

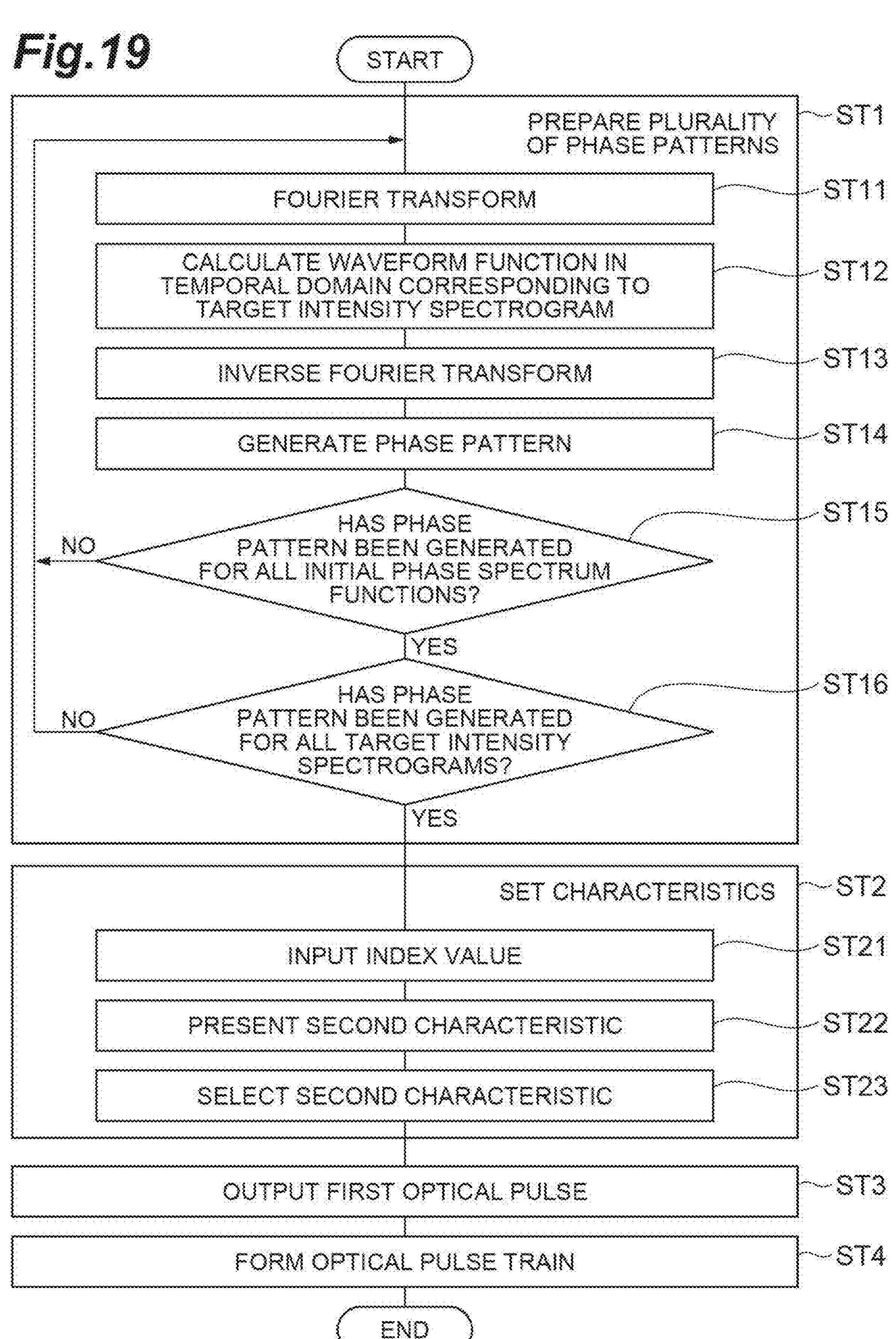
Fig.19
START
PREPARE PLURALITY OF PHASE PATTERNS
ST1
FOURIER TRANSFORM
ST11
CALCULATE WAVEFORM FUNCTION IN TEMPORAL DOMAIN CORRESPONDING TO TARGET INTENSITY SPECTROGRAM
ST12
INVERSE FOURIER TRANSFORM
ST13
GENERATE PHASE PATTERN
ST14
HAS PHASE PATTERN BEEN GENERATED FOR ALL INITIAL PHASE SPECTRUM FUNCTIONS?
ST15
NO
YES
HAS PHASE PATTERN BEEN GENERATED FOR ALL TARGET INTENSITY SPECTROGRAMS?
ST16
NO
YES
SET CHARACTERISTICS
ST2
INPUT INDEX VALUE
ST21
PRESENT SECOND CHARACTERISTIC
ST22
SELECT SECOND CHARACTERISTIC
ST23
OUTPUT FIRST OPTICAL PULSE
ST3
FORM OPTICAL PULSE TRAIN
ST4
END (1) $A_0(\omega)$, and $\Phi_0(\omega)$
(2-a) $\sqrt{A_0(\omega)}\exp\{i\Phi_0(\omega)\}$
C1
(3) $\sqrt{a_0(t)}\exp\{i\phi_0(t)\}$
(4-a)
$b_0(t) = \mathrm{Target}_0(t)$
(5) $\sqrt{b_0(t)}\exp\{i\phi_0(t)\}$
k=0
(5-a)
$SG_{0,k}(\omega,t)$
Target $SG_0(\omega,t)$
(5-b)
Target SG FUNCTION
(5-c)
DETERMINATION OF EVALUATION VALUE
(5-d) $\sqrt{b_0(t)}\exp\{i\phi_{0,k}(t)\}$
k=k+1
C2
(6) $\sqrt{B_{0,k}(\omega)}\exp\{i\Phi_{0,k}(\omega)\}$
Final result $\Phi_{TWC-TFD}(\omega)$

OPTICAL PULSE TRAIN GENERATION DEVICE AND OPTICAL PULSE TRAIN GENERATION METHOD

CROSS REFERENCE

Priority is claimed on Japanese Patent Application No. 2023-074839, filed Apr. 28, 2023, the content of which is incorporated herein by reference.

TECHNICAL FIELD

The present disclosure relates to an optical pulse train generation device and an optical pulse train generation method.

BACKGROUND

Patent Literature 1 (Japanese Unexamined Patent Publication No. 2018-036486) and Non Patent Literature 1 (M. Hacker, G. Stobrawa, T. Feurer, "Iterative Fourier transform algorithm for phase-only pulse shaping", Optics Express, Vol. 9, No. 4, pp. 191 to 199, 13 Aug. 2001) disclose a technique for shaping an optical pulse by modulating the spectral phase and/or the spectral intensity using a spatial light modulator (SLM). In Non Patent Literature 1, the spectral phase and the spectral intensity for obtaining a desired optical pulse waveform are calculated by using an iterative Fourier method. In Patent Literature 1, wavelength components (frequency components) of light forming the temporal intensity waveform are controlled. Also in Non Patent Literature 2 (Olivier Ripoll, Ville Kettunen, Hans Peter Herzig, "Review of iterative Fourier transform algorithms for beam shaping applications", Optical Engineering, Vol. 43, No. 11, pp. 2549 to 2556, November 2004), the iterative Fourier method is used to obtain a desired optical pulse waveform.

SUMMARY

For example, as a technique for controlling the temporal waveforms of various types of light such as ultrashort pulse light, there is a technique in which the spectral phase and the spectral intensity of the optical pulse are modulated by the SLM. In such a technique, a spectral phase and a spectral intensity for approximating the temporal intensity waveform of the light to a desired waveform are calculated, and a modulation pattern for applying the spectral phase and the spectral intensity to the light is presented to the SLM. Moreover, in addition to controlling the shape of the temporal intensity waveform, it is also possible to control the wavelength components (frequency components) of light forming the temporal intensity waveform (for example, see Patent Literature 1). When generating an optical pulse train including a plurality of optical pulses, applications to various devices, such as a dispersion measurement device, a laser processing device, an ultra-high-speed imaging camera, and a terahertz wave generator, are possible by changing the wavelength for each optical pulse. In such a technique, it is important to be able to easily obtain the optical pulse train having a temporal intensity waveform and wavelength components required by the user.

It is an object of the present disclosure to provide an optical pulse train generation device and an optical pulse train generation method capable of easily obtaining an optical pulse train having a temporal intensity waveform and wavelength components required by the user.

A form of optical pulse train generation device includes: a storage unit that stores in advance a plurality of phase patterns for forming, from a first optical pulse, an optical pulse train including a plurality of second optical pulses having time differences therebetween and having different center wavelengths, the plurality of phase patterns having different first characteristics regarding the first optical pulse or different second characteristics regarding the optical pulse train or having both of the different first characteristics and the different second characteristics; a characteristic setting unit that sets the first characteristic and the second characteristic in response to an input from a user; a light source that outputs the first optical pulse; and a pulse forming unit that has a spatial light modulator that displays one of the plurality of phase patterns and forms the optical pulse train from the first optical pulse. The storage unit stores the plurality of phase patterns in association with the first characteristic and the second characteristic. The spatial light modulator displays, among the plurality of phase patterns, one phase pattern corresponding to the first characteristic and the second characteristic set by the characteristic setting unit.

A form of optical pulse train generation method includes: preparing in advance a plurality of phase patterns for forming, from a first optical pulse, an optical pulse train including a plurality of second optical pulses having time differences therebetween and having different center wavelengths, the plurality of phase patterns having different first characteristics regarding the first optical pulse or different second characteristics regarding the optical pulse train or having both of the different first characteristics and the different second characteristics; setting the first characteristic and the second characteristic in response to an input from a user; outputting the first optical pulse; and forming the optical pulse train from the first optical pulse by using a spatial light modulator that displays one of the plurality of phase patterns. In the preparing, the plurality of phase patterns are stored in association with the first characteristic and the second characteristic. In the forming, one phase pattern corresponding to the first characteristic and the second characteristic set in the setting, among the plurality of phase patterns, is displayed on the spatial light modulator.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 11 is a block diagram showing a procedure for calculating a phase spectrum function in the preliminary data generation unit.

FIG. 12 is a diagram showing a procedure for calculating a phase spectrum function in the preliminary data generation unit by using mathematical formulas.

FIG. 14A is a diagram showing an intensity spectrogram transformed from the second waveform function shown in FIG. 13B. FIG. 14B is a diagram showing a phase spectrogram transformed from the second waveform function shown in FIG. 13B. FIG. 14C is a diagram showing an example of a target intensity spectrogram. FIG. 14D is a diagram showing a constrained phase spectrogram.

FIG. 19 is a flowchart showing a data generation method according to an embodiment.

DETAILED DESCRIPTION

Figure 1:
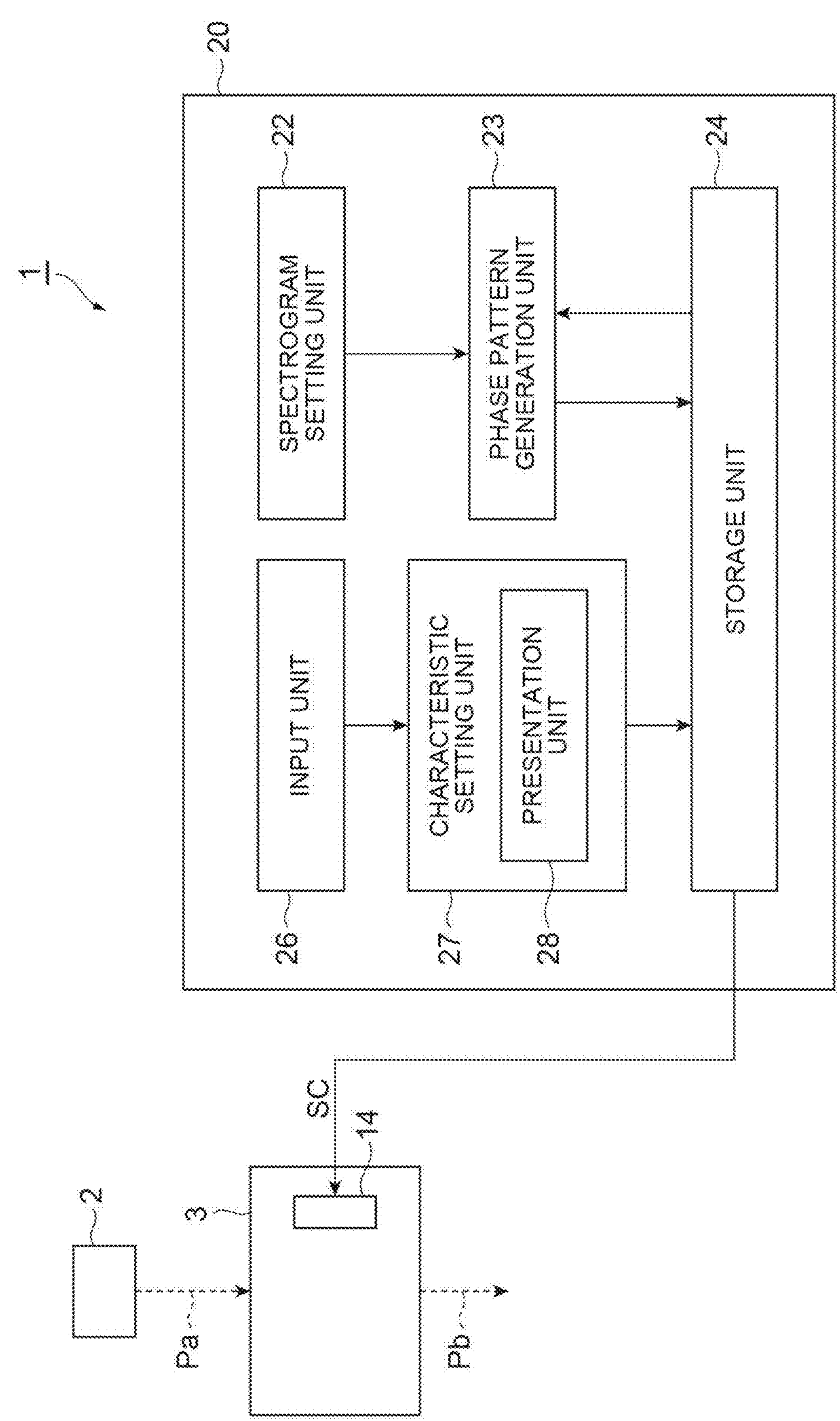
FIG. 1 is a diagram schematically showing the configuration of a light control device according to an embodiment of the present disclosure.

Hereinafter, embodiments will be described in detail with reference to the accompanying diagrams. The present invention is not limited to the embodiments described below. The technical scope of the present invention is determined based on the claims. In the description of the diagrams, the same elements are denoted by the same reference numerals, and the repeated description thereof will be omitted.

FIG. 1 is a diagram schematically showing the configuration of an optical pulse train generation device 1 according to an embodiment of the present disclosure. The optical pulse train generation device 1 according to the present embodiment generates an optical pulse train Pb including a plurality of second optical pulses from a first optical pulse Pa, which is a single optical pulse. As shown in FIG. 1, the optical pulse train generation device 1 includes a light source 2, a pulse forming unit 3, and a data providing unit 20.

The light source 2 outputs the first optical pulse Pa that is input to the pulse forming unit 3. The light source 2 is, for example, a laser light source such as a solid-state laser light source, and the first optical pulse Pa is, for example, a coherent optical pulse. The light source 2 is, for example, a femtosecond laser. In a practical example, the light source 2 is an LD direct excitation type Yb:YAG pulsed laser. The temporal waveform of the first optical pulse Pa is, for example, a Gaussian function. The full width at half maximum (FWHM) of the first optical pulse Pa is, for example, in the range of 10 fs to 10000 fs. As an example, the full width at half maximum (FWHM) of the first optical pulse Pa is 100 fs. The first optical pulse Pa has a predetermined bandwidth, and includes a plurality of continuous wavelength components. In a practical example, the bandwidth of the first optical pulse Pa is 10 nm, and the center wavelength of the first optical pulse Pa is 800 nm.

The pulse forming unit 3 has a spatial light modulator (SLM) 14, and the SLM 14 receives a control signal SC from the data providing unit 20. The pulse forming unit 3 converts the first optical pulse Pa from the light source 2 into the optical pulse train Pb. The control signal SC is generated based on data including a phase distribution for controlling the SLM 14. The data is, for example, computer-generated holograms (CGH).

Figure 2:
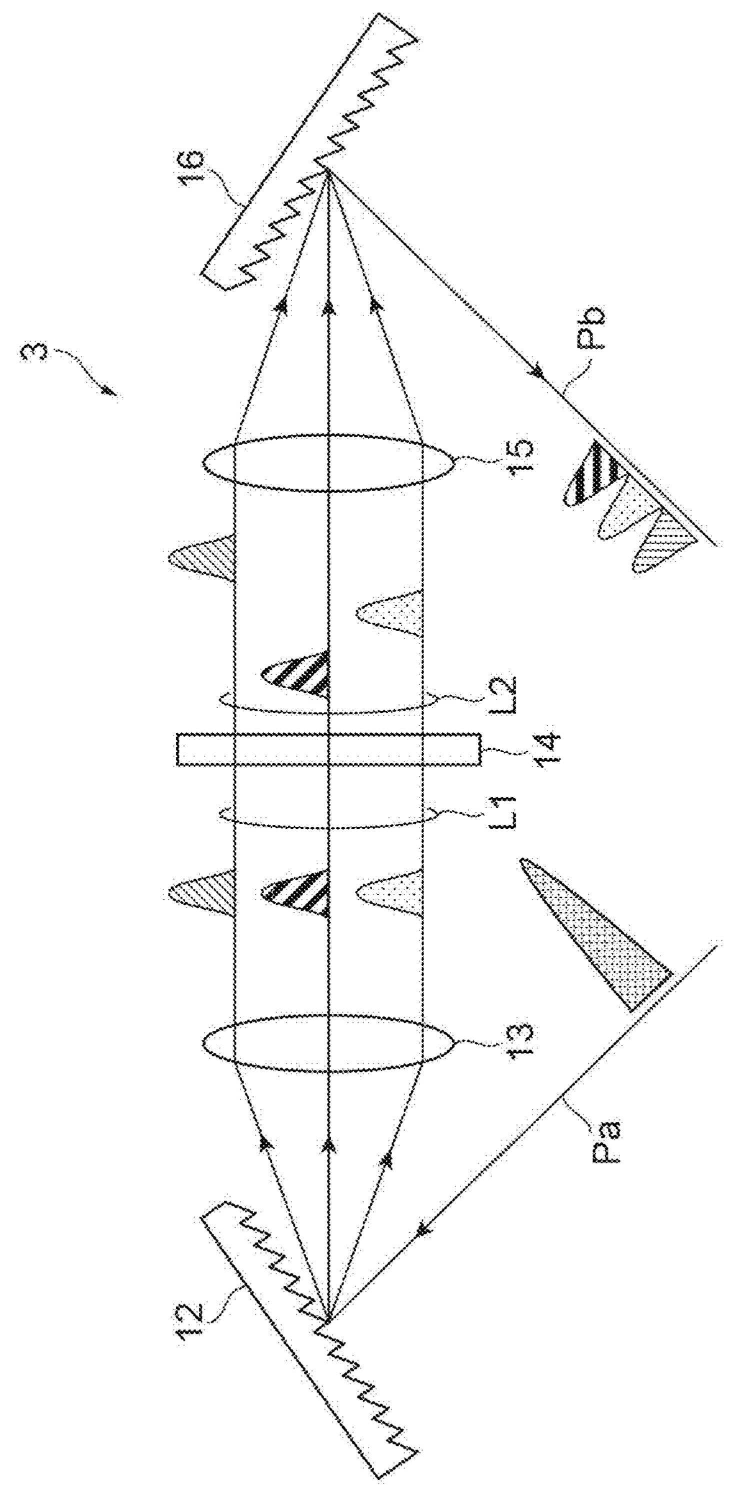
FIG. 2 is a diagram showing an example of the configuration of an optical waveform control unit.

FIG. 2 is a diagram showing an example of the configuration of the pulse forming unit 3. The pulse forming unit 3 includes a diffraction grating 12, a lens 13, the SLM 14, a lens 15, and a diffraction grating 16. The diffraction grating 12 is a spectral element in the present embodiment, and is optically coupled to the light source 2. The SLM 14 is optically coupled to the diffraction grating 12 through the lens 13. The diffraction grating 12 spatially separates a plurality of wavelength components included in the first optical pulse Pa for each wavelength. In addition, as spectral elements, other optical components such as a prism may be used instead of the diffraction grating 12.

The first optical pulse Pa is obliquely incident on the diffraction grating 12 to be split into a plurality of wavelength components. Light L1 including a plurality of wavelength components is condensed for each wavelength component by the lens 13, so that the image is formed on the modulation surface of the SLM 14. The lens 13 may be a convex lens formed of a light transmissive member, or may be a concave mirror having a concave light reflecting surface.

The SLM 14 shifts the phases of the plurality of wavelength components output from the diffraction grating 12 from each other, in order to convert the first optical pulse Pa into the optical pulse train Pb. Therefore, the SLM 14 receives the control signal SC from the data providing unit 20 and simultaneously performs phase modulation and intensity modulation of the light L1. In addition, the SLM 14 may perform only the phase modulation or only the intensity modulation. The SLM 14 is of a phase modulation type, for example. In a practical example, the SLM 14 is of an LCOS (Liquid Crystal on Silicon) type. In addition, although the transmissive SLM 14 is shown in the diagram, the SLM 14 may be of a reflective type. In addition, the SLM 14 is not limited to the phase modulation type spatial light modulator, and may be an intensity modulation type spatial light modulator, such as a DMD (Digital Micro Mirror Device), or a phase-intensity modulation type spatial light modulator.

Figure 3:
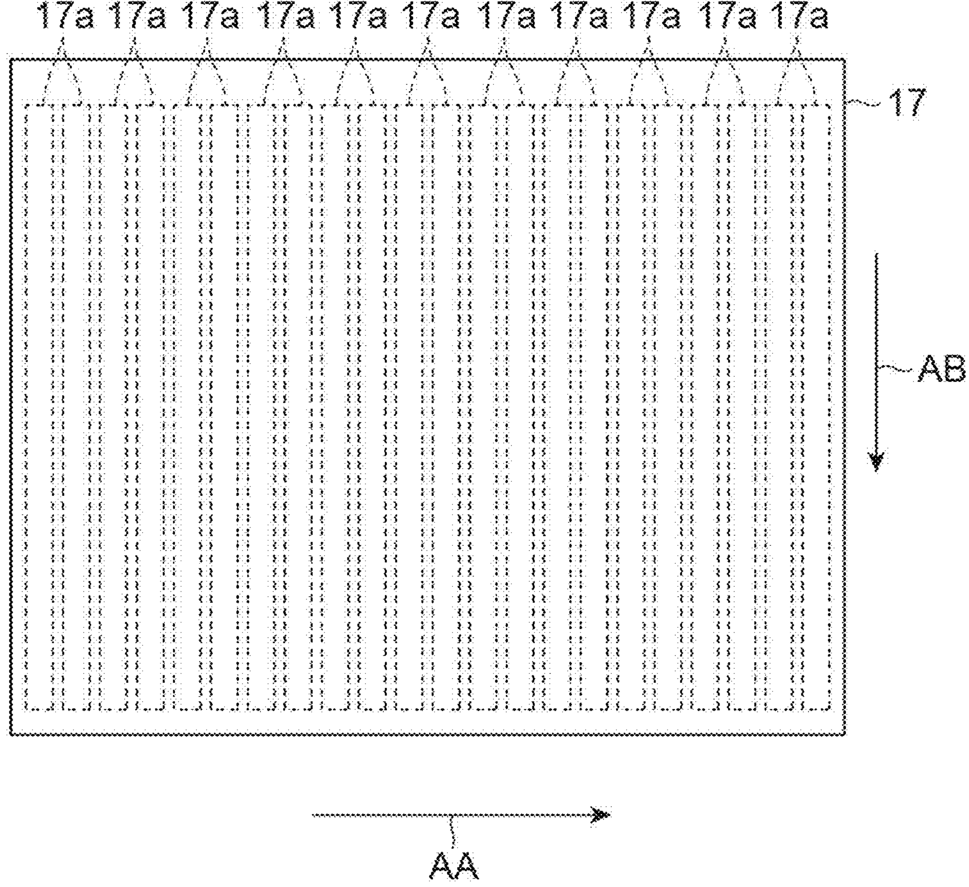
FIG. 3 is a diagram showing the modulation surface of a spatial light modulator.

FIG. 3 is a diagram showing a modulation surface 17 of the SLM 14. As shown in FIG. 3, on the modulation surface 17, a plurality of modulation regions 17*a* are aligned along a predetermined direction AA, and each modulation region 17*a* extends in a direction AB crossing the direction AA. The direction AA is a spectral direction by the diffraction grating 12. The modulation surface 17 functions as a Fourier transform surface, and each corresponding wavelength component after splitting is incident on each of the plurality of modulation regions 17*a*. The SLM 14 modulates the phase and intensity of each incident wavelength component independently from other wavelength components in each modulation region 17*a*. In addition, since the SLM 14 of the present embodiment is of the phase modulation type, the intensity modulation is realized by the phase pattern (phase image) presented on the modulation surface 17.

Each wavelength component of modulated light L2 modulated by the SLM 14 is focused at one point on the diffraction grating 16 by the lens 15. The lens 15 and the diffraction grating 16 function as an optical system for condensing the modulated light L2. The lens 15 may be a convex lens formed of a light transmissive member, or may be a concave mirror having a concave light reflecting surface. In addition, the diffraction grating 16 functions as a multiplexing optical system, and multiplexes the modulated wavelength components. That is, a plurality of wavelength components of the modulated light L2 are condensed and multiplexed by the lens 15 and the diffraction grating 16 to form the optical pulse train Pb. When the SLM 14 is of a reflective type, the lens 13 and the lens 15 may be formed by using a common lens, and the diffraction grating 12 and the diffraction grating 16 may be formed by using a common diffraction grating.

Figure 4A:
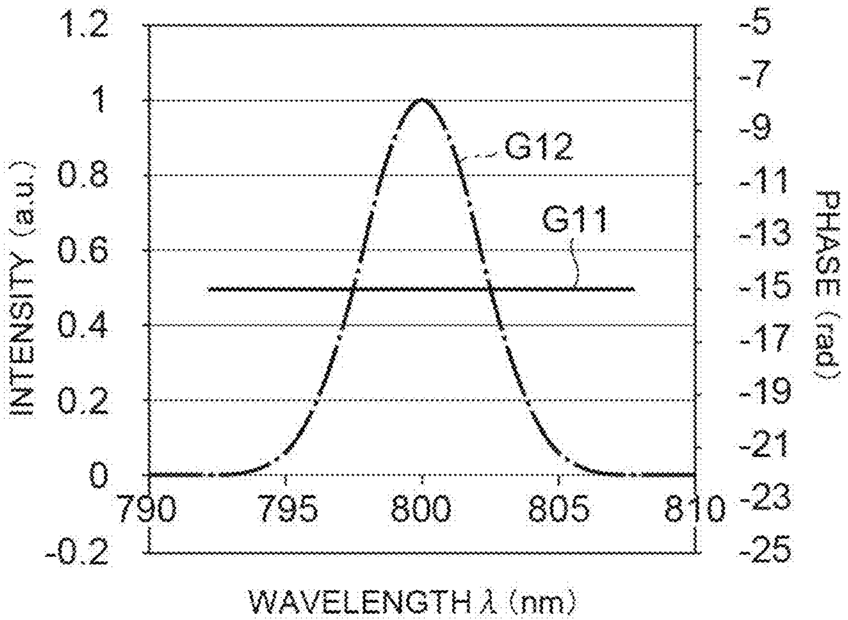
FIG. 4A shows the spectral waveform of single-pulse input light.
Figure 4B:
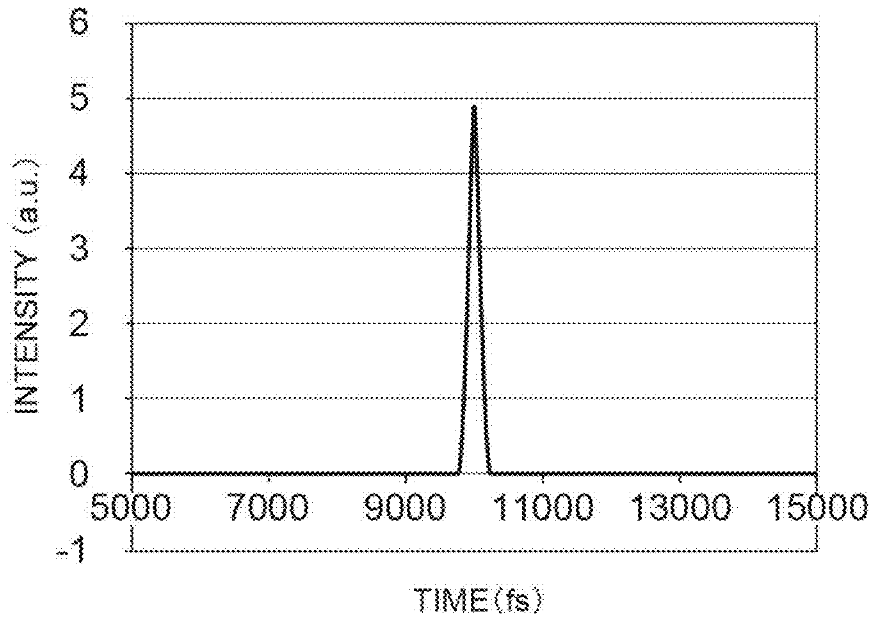
FIG. 4B shows the temporal intensity waveform of the input light.
Figure 5A:
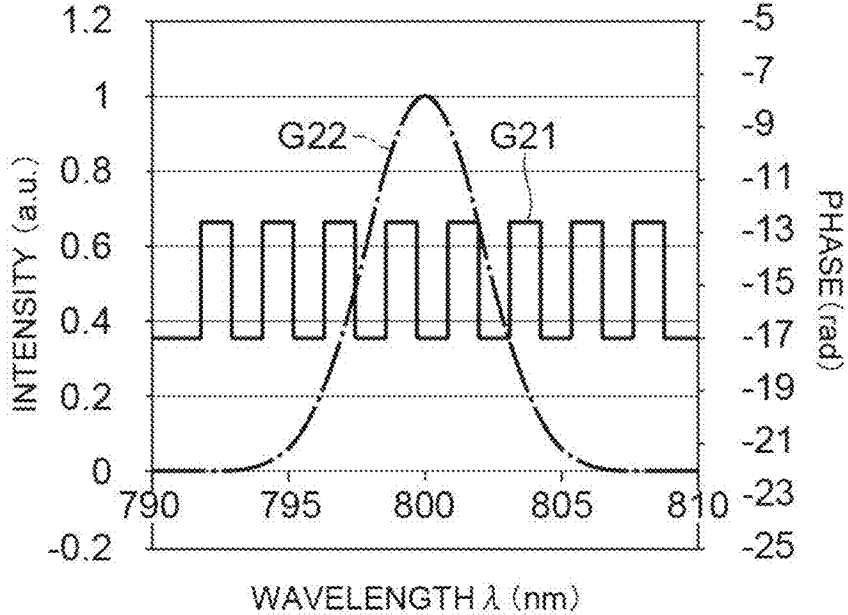
FIG. 5A shows the spectral waveform of output light when rectangular-wave spectral phase modulation is applied in the spatial light modulator.
Figure 5B:
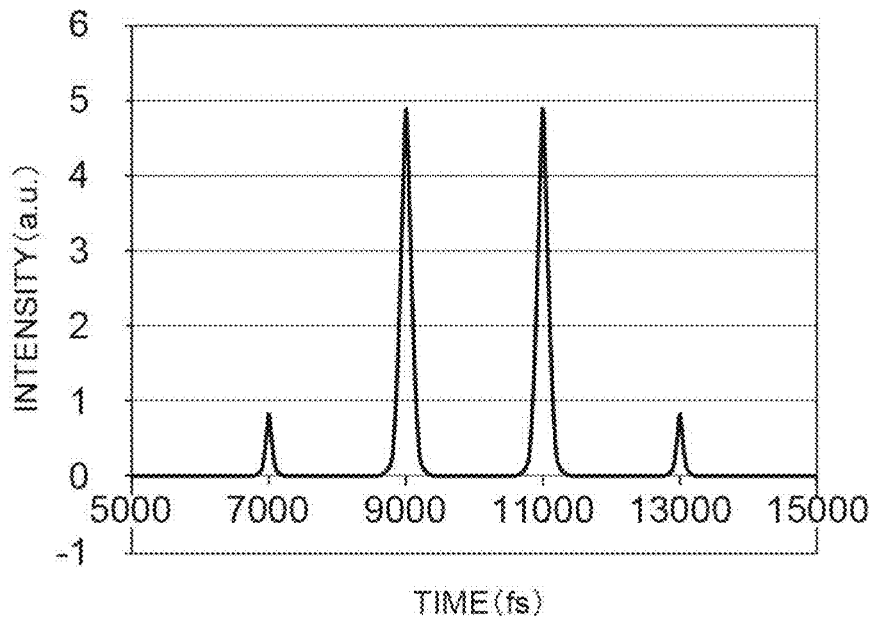
FIG. 5B shows the temporal intensity waveform of the output light.

A region in front of the lens 15 (spectral domain) and a region behind the diffraction grating 16 (temporal domain) have a Fourier transform relationship therebetween, and the phase modulation in the spectral domain affects the temporal intensity waveform in the temporal domain. Therefore, the optical pulse train Pb has a temporal intensity waveform, which is different from the first optical pulse Pa, according to the modulation pattern of the SLM 14. Here, FIG. 4A shows an example of the spectral waveform (spectral phase G11 and spectral intensity G12) of the first optical pulse Pa, and FIG. 4B shows the temporal intensity waveform of the first optical pulse Pa having the spectral waveform in FIG. 4A. In addition, FIG. 5A shows an example of the spectral waveform (spectral phase G21 and spectral intensity G22) of the optical pulse train Pb when rectangular-wave spectral phase modulation is applied in the SLM 14, and FIG. 5B shows the temporal intensity waveform of the optical pulse train Pb having the spectral waveform in FIG. 5A. In FIGS. 4A and 5A, the horizontal axis indicates wavelength (nm), the left vertical axis indicates the intensity value (any unit) of the intensity spectrum, and the right vertical axis indicates the phase value (rad) of the spectral phase. In addition, in FIGS. 4B and 5B, the horizontal axis indicates time (femtoseconds) and the vertical axis indicates light intensity (any unit). In this example, a single pulse of the first optical pulse Pa is converted into a double pulse with higher-order light as the optical pulse train Pb by applying a rectangular-wave phase spectrum waveform to the optical pulse train Pb. In addition, the spectrum and the waveform shown in FIGS. 5A and 5B are examples, and the temporal intensity waveform of the optical pulse train Pb can be shaped into various shapes by combining various spectral phases and spectral intensities.

The optical pulse train Pb may be a group of single pulses generated by using each wavelength band obtained by dividing the spectrum forming the first optical pulse Pa into a plurality of wavelength bands. In this case, there may be portions that overlap each other at the boundaries of the plurality of wavelength bands. Such an optical pulse train Pb is called a "band-controlled burst pulse".

Figures 6A, 6B, 6C:
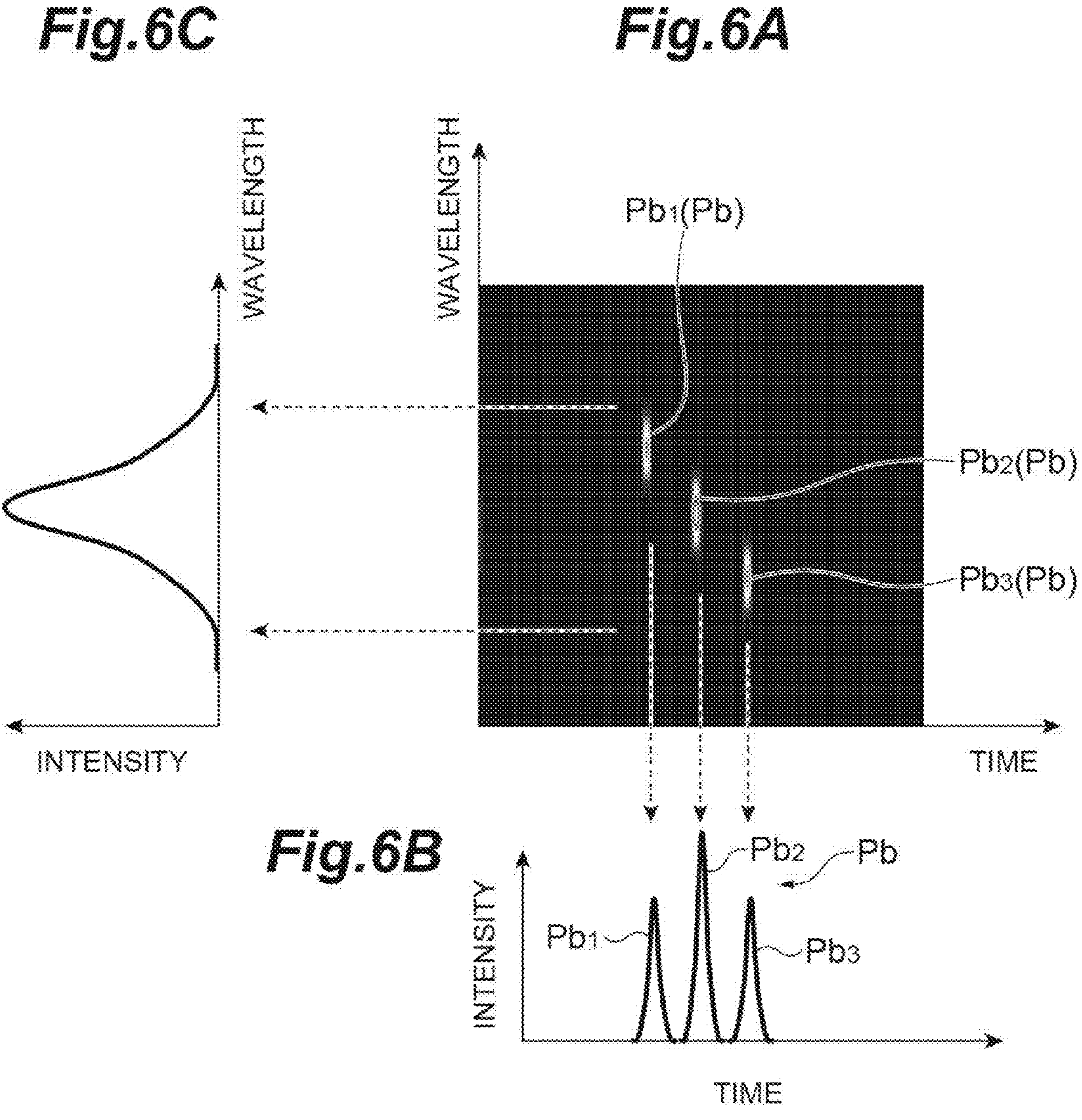
FIGS. 6A, 6B, and 6C are diagrams showing examples of band-controlled burst pulses.

FIGS. 6A to 6C are diagrams showing examples of the band-controlled burst pulse. In this example, the optical pulse train Pb including three second optical pulses $Pb_1$ to $Pb_3$ is shown. FIG. 6A is an intensity spectrogram in which the horizontal axis indicates time, the vertical axis indicates wavelength, and the light intensity is expressed by color shading. FIG. 6B shows a temporal waveform of the optical pulse train Pb. The temporal waveform of each of the second optical pulses $Pb_1$ to $Pb_3$ is, for example, a Gaussian function.

As shown in FIGS. 6A and 6B, the peaks of the three second optical pulses $Pb_1$ to $Pb_3$ are temporally separated from each other, and the propagation timings of the three second optical pulses $Pb_1$ to $Pb_3$ are shifted from each other. In other words, for one second optical pulse $Pb_1$, another second optical pulse $Pb_2$ has a time delay, and for another second optical pulse $Pb_2$, still another second optical pulse $Pb_3$ has a time delay. However, the bottom portions of the adjacent second optical pulses $Pb_1$ and $Pb_2$ (or $Pb_2$ and $Pb_3$) may overlap each other. The time interval (peak interval) between the adjacent second optical pulses $Pb_1$ and $Pb_2$ (or $Pb_2$ and $Pb_3$) is, for example, in the range of 10 fs to 10000 fs. As an example, the time interval (peak interval) between the adjacent second optical pulses $Pb_1$ and $Pb_2$ (or $Pb_2$ and $Pb_3$) is 2000 fs. In addition, the FWHM of each of the second optical pulse $Pb_1$ to $Pb_3$ is, for example, in the range of 10 fs to 5000 fs. As an example, the FWHM of each of the second optical pulse $Pb_1$ to $Pb_3$ is 300 fs.

FIG. 6C shows a spectrum obtained by combining the three second optical pulses $Pb_1$ to $Pb_3$. As shown in FIG. 6C, the spectrum obtained by combining the three second optical pulses $Pb_1$ to $Pb_3$ has a single peak. However, referring to FIG. 6A, the center wavelengths of the three second optical pulses $Pb_1$ to $Pb_3$ are shifted from each other. The spectrum having a single peak shown in FIG. 6C is almost the same as the spectrum of the first optical pulse Pa.

The peak wavelength interval between the adjacent second optical pulses $Pb_1$ and $Pb_2$ (or $Pb_2$ and $Pb_3$) is determined by the spectral bandwidth of the first optical pulse Pa, and is in the range of approximately twice the full width at half maximum. For example, when the spectral bandwidth of the first optical pulse Pa is 10 nm, the peak wavelength interval is 5 nm. As a specific example, when the center wavelength of the first optical pulse Pa is 800 nm, the peak wavelengths of the three second optical pulses $Pb_1$ to $Pb_3$ can be 795 nm, 800 nm, and 805 nm, respectively.

Figures 7A, 7B, 7C:
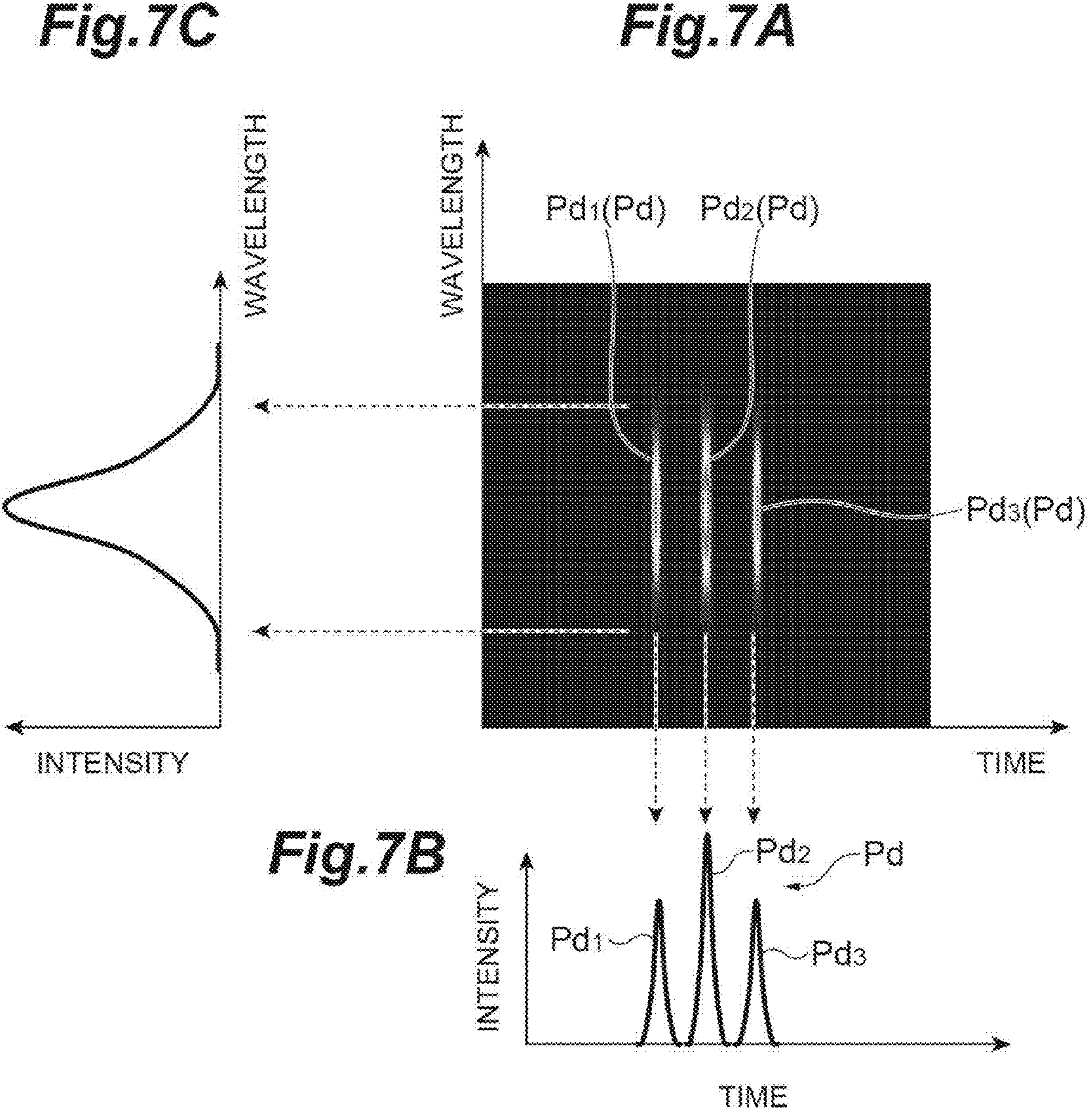
FIGS. 7A, 7B, and 7C are diagrams showing examples of burst pulses that are not band-controlled.

FIGS. 7A to 7C are diagrams showing examples of burst pulses that are not band-controlled. In this example, an optical pulse train Pd including three optical pulses $Pd_1$ to $Pd_3$ is shown. Similarly to FIG. 6A, FIG. 7A is an intensity spectrogram in which the horizontal axis indicates time, the vertical axis indicates wavelength, and the light intensity is expressed by color shading. FIG. 7B shows a temporal waveform of the optical pulse train Pd. FIG. 7C shows a spectrum obtained by combining the three optical pulses $Pd_1$ to $Pd_3$.

As shown in FIGS. 7A to 7C, the peaks of the three optical pulses $Pd_1$ to $Pd_3$ are temporally separated from each other, but the center wavelengths of the three optical pulses $Pd_1$ to $Pd_3$ match each other. The pulse forming unit 3 of the present embodiment does not generate such an optical pulse train Pd, but generates the optical pulse train Pb shown in FIGS. 6A to 6C in which the center wavelengths of the second optical pulses $Pb_1$ to $Pb_3$ are different.

FIG. 1 is referred to again. The data providing unit 20 is communicably connected to the SLM 14, and prepares a phase modulation pattern for approximating the temporal intensity waveform and wavelength components of the optical pulse train Pb to desired ones and provides the control signal SC including the phase modulation pattern to the SLM 14. The data providing unit 20 of the present embodiment presents to the SLM 14 a phase pattern for phase modulation for applying a spectral phase and a spectral intensity to obtain the optical pulse train Pb, which has a desired temporal intensity waveform and wavelength components, to the optical pulse train Pb. For this purpose, the data providing unit 20 includes a spectrogram setting unit 22, a phase pattern generation unit 23, a storage unit 24, an input unit 26, and a characteristic setting unit 27. The characteristic setting unit 27 includes a presentation unit 28.

In addition, the spectrogram setting unit 22 and the phase pattern generation unit 23 may be provided separately from the data providing unit 20. In this case, the spectrogram setting unit 22 and the phase pattern generation unit 23 provide the data providing unit 20 with data regarding the phase modulation pattern. The data providing unit 20 may be, for example, a personal computer, a smart device such as a smartphone or a tablet terminal, or a computer having a processor such as a cloud server.

Figure 8:
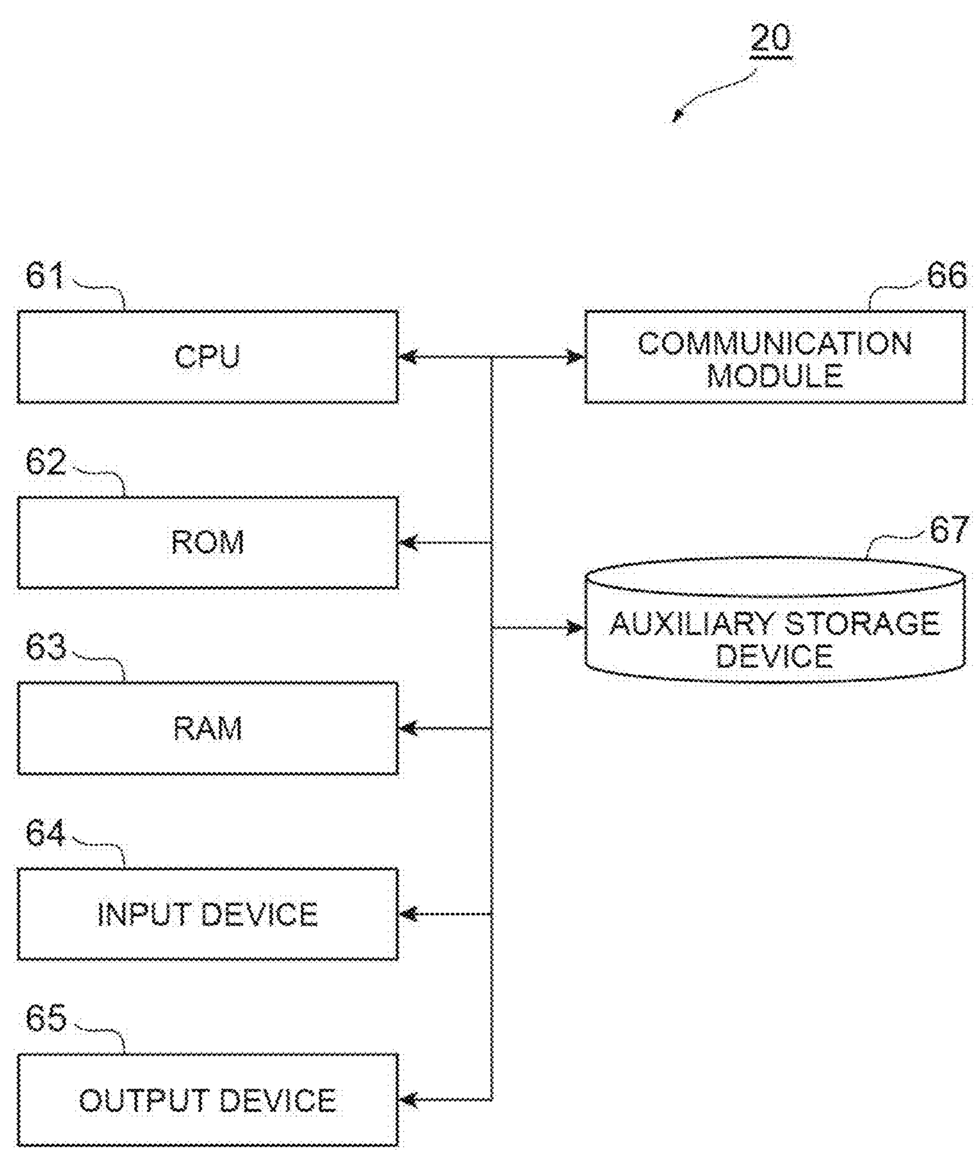
FIG. 8 is a diagram schematically showing an example of the hardware configuration of a data generation device.

FIG. 8 is a diagram schematically showing an example of the hardware configuration of the data providing unit 20. As shown in FIG. 8, the data providing unit 20 can physically be a normal computer including: a processor (CPU) 61; a main storage device such as a ROM 62 and a RAM 63; an input device 64 such as a keyboard, a mouse, and a touch screen; an output device 65 such as a display (including a touch screen); a communication module 66 such as a network card for transmitting and receiving data to and from other devices; and an auxiliary storage device 67 such as a hard disk.

The processor 61 of the computer can realize some of the functions of the data providing unit 20 by using a data providing program. Therefore, the data providing program causes the processor 61 of the computer to operate as the spectrogram setting unit 22, the phase pattern generation unit 23, the input unit 26, and the characteristic setting unit 27 in the data providing unit 20. The data providing program is stored in a storage device (storage medium) inside or outside the computer. The storage device may be a non-transitory recording medium. Examples of recording media include a recording medium such as a flexible disk, a CD, or a DVD, a recording medium such as a ROM, a semiconductor memory, and a cloud server. The ROM 62 or the auxiliary storage device 67 forms the storage unit 24. The input device 64 forms the input unit 26. The output device 65 forms the presentation unit 28.

The storage unit 24 stores Q (Q is an integer of 2 or more) initial phase spectrum functions that are used when generating a phase pattern for approximating the temporal intensity waveform and wavelength components of the optical pulse train Pb to desired ones. The initial phase spectrum function will be detailed later.

The spectrogram setting unit 22 generates R (R is an integer of 2 or more) target intensity spectrograms. The target intensity spectrogram is an intensity spectrogram indicating the target optical pulse train Pb, which is used when calculating the phase pattern. The target intensity spectrogram is generated according to a first characteristic regarding the first optical pulse Pa, such as the bandwidth of the first optical pulse Pa, and a second characteristic regarding the optical pulse train Pb, such as the number of pulses in the optical pulse train Pb. That is, one or both of the corresponding first characteristic and second characteristic are different for each target intensity spectrogram. The first characteristic regarding the first optical pulse Pa includes, for example, at least one characteristic selected from the group consisting of the center wavelength of the first optical pulse Pa, the bandwidth of the first optical pulse Pa, the spectral shape of the first optical pulse Pa, the spectral phase of the first optical pulse Pa, and the type of the light source 2. The second characteristic regarding the optical pulse train Pb includes, for example, at least one characteristic selected from the group consisting of the number of a plurality of second optical pulses $Pb_1$ to $Pb_3$ (for example, three in the examples shown in FIGS. 6A to 6C), a time interval between the plurality of second optical pulses $Pb_1$ to $Pb_3$, a variation in time interval between the plurality of second optical pulses $Pb_1$ to $Pb_3$, the center wavelength of each of the plurality of second optical pulses $Pb_1$ to $Pb_3$, a center wavelength difference between the plurality of second optical pulses $Pb_1$ to $Pb_3$, the bandwidth of each of the plurality of second optical pulses $Pb_1$ to $Pb_3$, a variation in the bandwidth of each of the plurality of second optical pulses $Pb_1$ to $Pb_3$, a peak intensity ratio between the plurality of second optical pulses $Pb_1$ to $Pb_3$, and a variation in peak intensity between the plurality of second optical pulses $Pb_1$ to $Pb_3$.

The center wavelength of the first optical pulse Pa is the center wavelength in the wavelength band of the first optical pulse Pa. In many cases, the center wavelength of the first optical pulse Pa matches the peak wavelength of the spectrum of the first optical pulse Pa. The bandwidth of the first optical pulse Pa is the width of the wavelength band (a difference between the maximum wavelength and the minimum wavelength) of the first optical pulse Pa. The time interval between the second optical pulses $Pb_1$ to $Pb_3$ is the interval between the peak times of the second optical pulses $Pb_1$ to $Pb_3$. Various variations are expressed numerically, for example, by standard deviation.

R pieces of data regarding R target intensity spectrograms are provided from the spectrogram setting unit 22 to the phase pattern generation unit 23. For each of the provided target intensity spectrograms, the phase pattern generation unit 23 calculates Q phase spectrum functions suitable for its realization by using each of the Q initial phase spectrum functions stored in the storage unit 24. In other words, the phase pattern generation unit 23 calculates Q phase spectrum functions for one target intensity spectrogram. Then, for each target intensity spectrogram, the phase pattern generation unit 23 calculates each of the Q phase patterns based on each of the Q phase spectrum functions. (R×Q) phase patterns generated by the phase pattern generation unit 23 are output to the storage unit 24 and stored in the storage unit 24. The storage unit 24 stores the (R×Q) phase patterns in association with the first characteristic and the second characteristic. Here, "store in association with" refers to storing a plurality of phase patterns in a manner in which the phase pattern corresponding to the first characteristic and the second characteristic is uniquely specified when the first characteristic and the second characteristic are specified.

Figure 9:
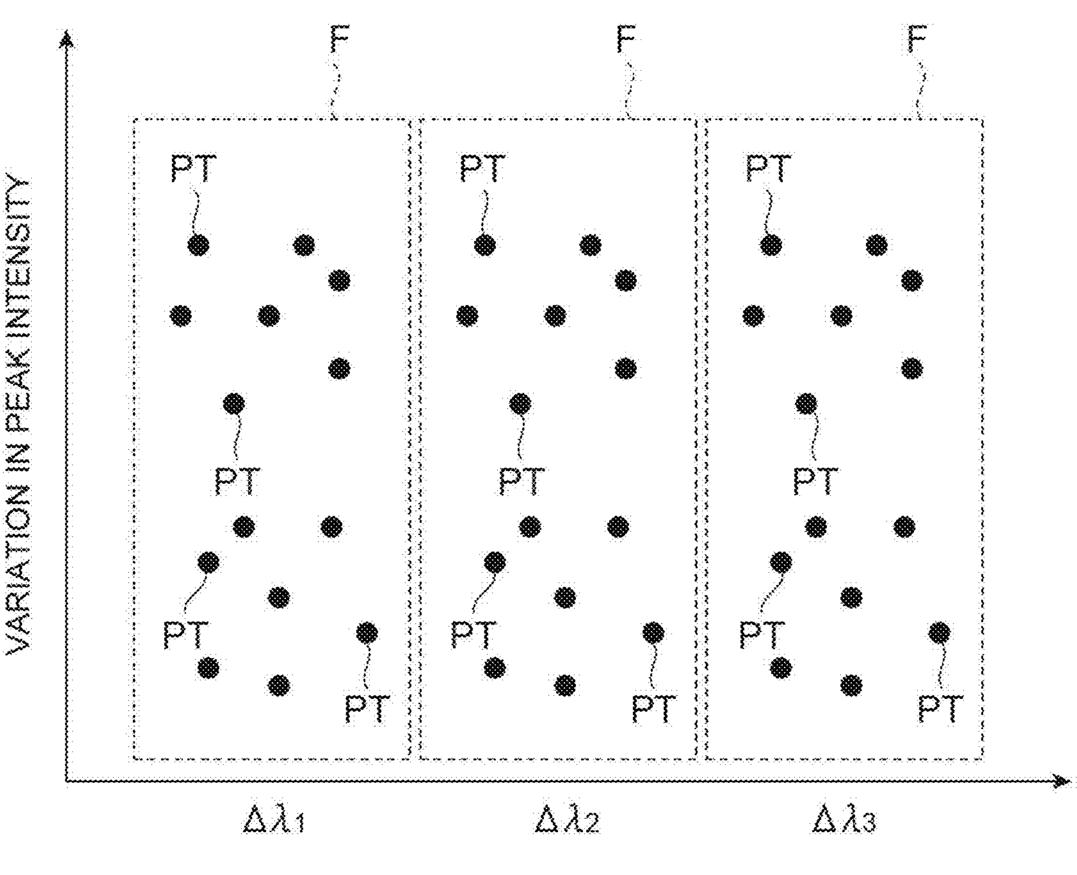
FIG. 9 is a diagram conceptually showing an example of a storage method in a storage unit.

FIG. 9 is a diagram conceptually showing an example of a storage method in the storage unit 24. As shown in FIG. 9, the storage unit 24 stores a plurality of (three in the diagram) phase pattern groups F. Each of the plurality of phase pattern groups F includes two or more phase patterns PT that are parts of the (R×Q) phase patterns PT. All the phase patterns PT are associated with the second characteristic (in the diagram, the center wavelength difference between pulses and the variation in peak intensity are illustrated, but the second characteristic is not limited thereto) of the optical pulse train Pb. Each of the plurality of phase pattern groups F has a one-to-one correspondence with each of two or more index values regarding a predetermined second characteristic of the optical pulse train Pb. FIG. 9 shows three center wavelength differences $\Delta\lambda_1$ to $\Delta\lambda_3$ as examples of index values. That is, each of the plurality of phase pattern groups F is uniquely specified by each of the center wavelength differences $\Delta\lambda_1$ to $\Delta\lambda_3$. The center wavelength differences $\Delta\lambda_1$ to $\Delta\lambda_3$ as index values have values close to the second characteristic (here, a center wavelength difference between pulses) of the optical pulse train Pb obtained by each phase pattern PT in the phase pattern group F associated with each index value. In addition, other second characteristics may be used as index values without being limited to the center wavelength difference.

FIG. 1 is referred to again. The characteristic setting unit 27 sets a first characteristic regarding the first optical pulse Pa and a second characteristic regarding the optical pulse train Pb in response to the user' input to the input unit 26. For example, one index value (for example, one of the center wavelength differences $\Delta\lambda_1$ to $\Delta\lambda_3$) is selected by the user through the input unit 26. The presentation unit 28 of the characteristic setting unit 27 presents, to the user, the second characteristic of the optical pulse train Pb (for example, a center wavelength difference between pulses and a variation in peak intensity) obtained by each phase pattern PT of the phase pattern group F corresponding to one index value selected by the user's input. At this time, the presentation format may be the form of a graph shown in FIG. 9, or may be a form in which the numerical values themselves are presented. The user selects one value from the plurality of presented values related to the second characteristic by operating the input unit 26. The storage unit 24 provides the SLM 14 with the control signal SC including the phase pattern corresponding to the first characteristic and the second characteristic set by the characteristic setting unit 27. The SLM 14 displays one phase pattern included in the control signal SC.

Figure 10:
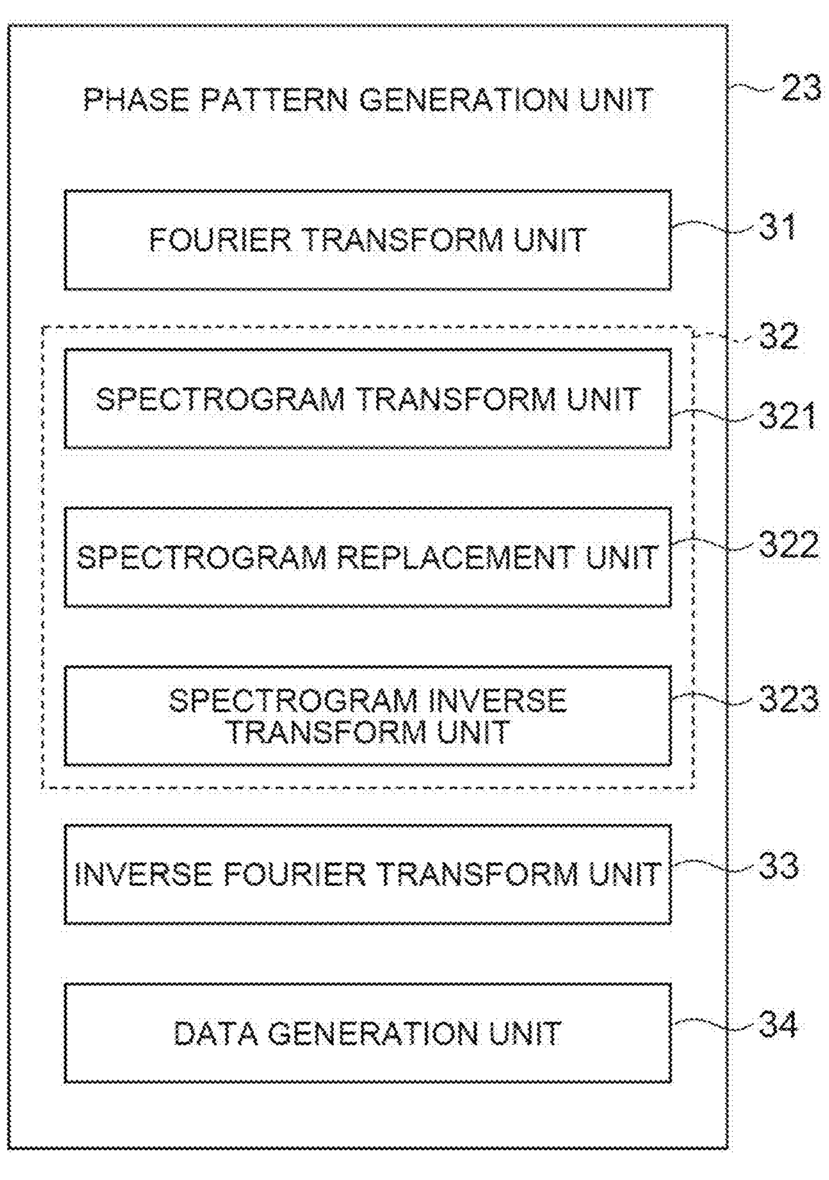
FIG. 10 is a block diagram showing the internal configuration of a preliminary data generation unit.

FIG. 10 is a block diagram showing the internal configuration of the phase pattern generation unit 23. As shown in FIG. 10, the phase pattern generation unit 23 includes a Fourier transform unit 31 (first transform unit), a function transform unit 32 (second transform unit), an inverse Fourier transform unit 33 (third transform unit), and a data generation unit 34. The function transform unit 32 includes a spectrogram transform unit 321, a spectrogram replacement unit 322, and a spectrogram inverse transform unit 323. The phase pattern generation unit 23 calculates a phase spectrum function, which is the basis of the phase pattern, by using a calculation method described below. FIG. 11 is a block diagram showing a procedure for calculating the phase spectrum function in the phase pattern generation unit 23. FIG. 12 is a diagram showing a procedure for calculating the phase spectrum function in the phase pattern generation unit 23 by using mathematical formulas.

First, an initial spectrum function A1, that is, an initial intensity spectrum function $A_0(\omega)$ and an initial phase spectrum function $\Phi_0(\omega)$, which are functions of the frequency $\omega$, are prepared. As an example, the initial intensity spectrum function $A_0(\omega)$ indicates the intensity spectrum of the first optical pulse Pa, but is not limited thereto. In addition, the initial phase spectrum function $\Phi_0(\omega)$ is sequentially selected from a plurality of initial phase spectrum functions $\Phi_0(\omega)$ stored in the storage unit 24. The plurality of initial phase spectrum functions $\Phi_0(\omega)$ may be automatically generated by using random numbers, for example. The number of initial phase spectrum functions $\Phi_0(\omega)$ is, for example, 100 or more. The data providing unit 20 may further include a unit that generates the plurality of initial phase spectrum functions $\Phi_0(\omega)$, that is, an initial phase spectrum function generation unit.

Figure 13A:
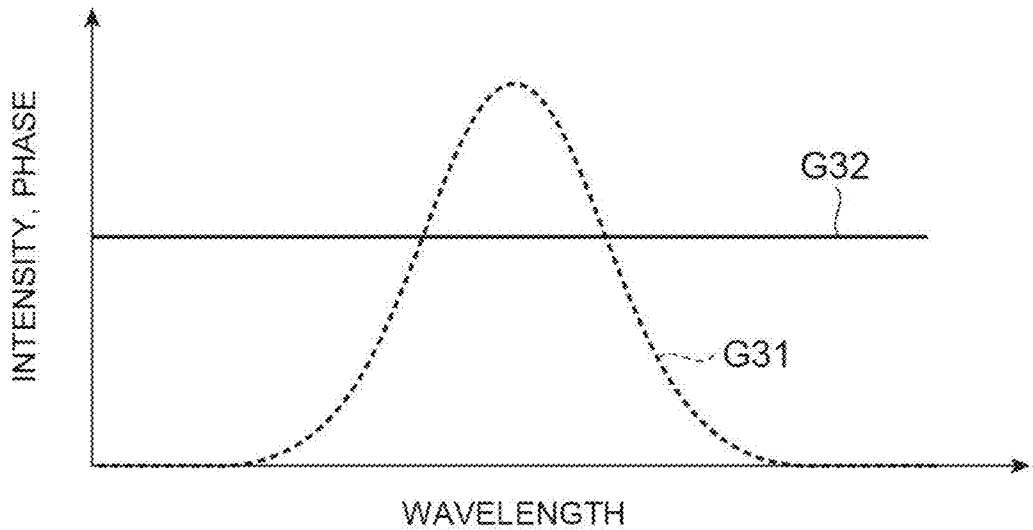
FIG. 13A is a graph schematically showing an initial intensity spectrum function and an initial phase spectrum function as an example of an initial spectrum function.

FIG. 13A is a graph schematically showing the initial intensity spectrum function $A_0(\omega)$ and the initial phase spectrum function $\Phi_0(\omega)$ as an example of the initial spectrum function A1. In FIG. 13A, a graph G31 shows the intensity spectrum function $A_0(\omega)$, and a graph G32 shows the phase spectrum function $\Phi_0(\omega)$. The horizontal axis indicates wavelength, and the vertical axis indicates the intensity value of the intensity spectrum function or the phase value of the phase spectrum function.

A first waveform function A2 is expressed by the following Formula (1). Here, n is a repetition number (n=1, 2, . . . , N), and i is an imaginary number. In the first cycle (n=1), the initial spectrum function A1 is set as the first waveform function A2. That is, setting is made to satisfy $\Phi_1(\omega)=\Phi_0(\omega)$ of the first waveform function A2 in the first cycle of repetition.

[Formula 1]

$$\sqrt{A_0(\omega)}\exp\{i\Phi_n(\omega)\} \tag{1}$$

The Fourier transform unit 31 of the phase pattern generation unit 23 performs Fourier transform from the frequency domain to the temporal domain on the first waveform function A2 (arrow B1 in the diagram, first transform step). As a result, as shown by the following Formula (2), a second waveform function A3 in the temporal domain including a temporal intensity waveform function $a_n(t)$ and a temporal phase waveform function $\phi_n(t)$ is obtained.

[Formula 2]

$$\sqrt{a_n(t)}\exp\{i\phi_n(t)\} \tag{2}$$

Figure 13B:
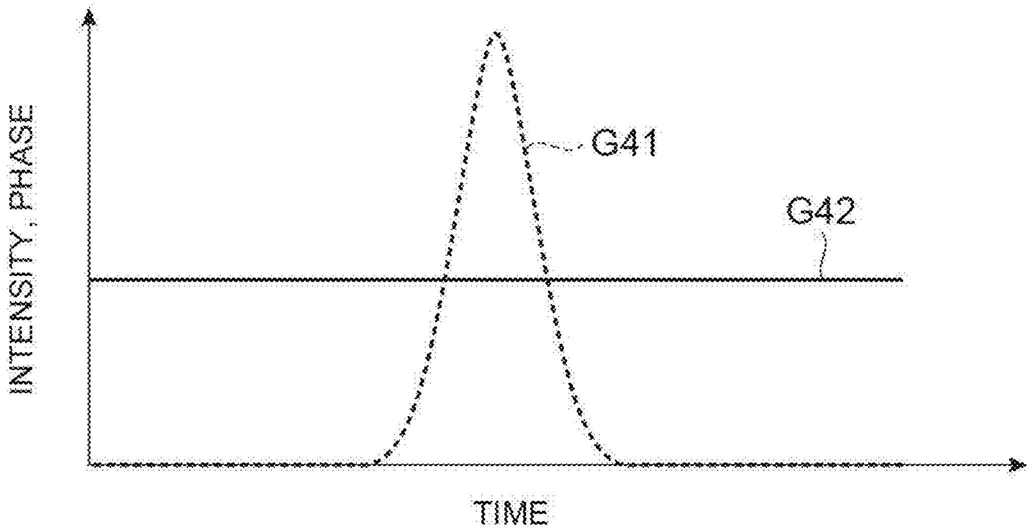
FIG. 13B is a graph schematically showing a temporal intensity waveform function and a temporal phase waveform function of a second waveform function in the first cycle, which has been Fourier-transformed from a first waveform function.

FIG. 13B is a graph schematically showing a temporal intensity waveform function $a_1(t)$ and a temporal phase waveform function $\phi_1(t)$ of the second waveform function A3 in the first cycle, which has been Fourier-transformed from the first waveform function A2 shown in FIG. 13A. In FIG. 13B, a graph G41 shows the temporal intensity waveform function $a_1(t)$, and a graph G42 shows the temporal phase waveform function $\phi_1(t)$. The horizontal axis indicates time, and the vertical axis indicates the intensity value of the temporal intensity waveform function or the phase value of the temporal phase waveform function.

Then, the function transform unit 32 transforms a third waveform function A5 in the temporal domain including a temporal intensity waveform function $a'_n(t)$ and a temporal phase waveform function $\phi'_n(t)$, which corresponds to an intensity spectrogram A43 (target intensity spectrogram) generated in advance, from the second waveform function A3 (second transform step). Hereinafter, a specific operation of the function transform unit 32 will be described.

The spectrogram transform unit 321 of the function transform unit 32 performs a short-time Fourier transform (STFT) on the second waveform function A3 (arrow B2 in the diagram). As a result, $a_n$ intensity spectrogram A41 and a phase spectrogram A42 shown by the following Formula (3) are obtained.

[Formula 3]

$$\sqrt{B_n(\omega, t)}\exp\{i\varphi_n(\omega, t)\} \tag{3}$$

FIGS. 14A and 14B are diagrams respectively showing the intensity spectrogram A41 and the phase spectrogram A42 transformed from the second waveform function A3 shown in FIG. 13B. In addition, in FIGS. 14A and 14B, the horizontal axis indicates time and the vertical axis indicates wavelength. In addition, the value of the spectrogram is shown by the brightness of the diagram, and the value of the spectrogram increases as the brightness increases. In this example, a single optical pulse $Pb_0$ appears in the intensity spectrogram A41.

In addition, the processing in the spectrogram transform unit 321 for transforming the second waveform function A3 into the intensity spectrogram A41 and the phase spectrogram A42 is not limited to the STFT, and may be other kinds of processing. The processing for transforming a temporal waveform into a spectrogram is called time-frequency transform, including the STFT. In the time-frequency transform, frequency filter processing or numerical calculation processing (processing for deriving the spectrum for each time by performing multiplication while shifting the window function) is performed on a composite signal, such as a temporal waveform, to generate three-dimensional information including time, frequency, and signal component intensity (intensity spectrum). In the present embodiment, the transform result (time, frequency, and intensity spectrum) is defined as a "spectrogram". Examples of time-frequency transform include wavelet transforms (Haar wavelet transform, Gabor wavelet transform, Mexican Hat wavelet transform, and Morley wavelet transform) in addition to the STFT.

Then, the spectrogram replacement unit 322 of the function transform unit 32 replaces the intensity spectrogram A41 with the intensity spectrogram A43 (target intensity spectrogram) generated in advance, and constrains the phase spectrogram A42 (arrow B3 in the diagram). The intensity spectrogram A43 is provided from the spectrogram setting unit 22 (see FIG. 1). Constraining the phase spectrogram A42 means not changing the phase spectrogram A42 (leaving the phase spectrogram A42 as it is). Therefore, the above Formula (3) is replaced with the following Formula (4). TSG(ω, t) is a target intensity spectrogram function.

[Formula 4]

$$\sqrt{TSG(\omega, t)}\exp\{i\varphi_n(\omega, t)\} \tag{4}$$

FIG. 14C is a diagram showing an example of the intensity spectrogram A43. FIG. 14D is a diagram showing the constrained phase spectrogram A42. In FIGS. 14C and 14D, the horizontal axis indicates time and the vertical axis indicates wavelength. The value of the spectrogram is shown by the brightness of the diagram, and the value of the spectrogram increases as the brightness increases. In this example, the intensity spectrogram A43 includes the optical pulse train Pb including the three optical pulses $Pb_1$, $Pb_2$, and $Pb_3$ having time differences therebetween and having different center wavelengths. The constrained phase spectrogram A42 is completely the same as in FIG. 14B.

Then, the spectrogram inverse transform unit 323 of the function transform unit 32 performs an inverse STFT on the intensity spectrogram A43 and the phase spectrogram A42 (arrow B4 in the diagram). In addition, similarly to the spectrogram transform unit 321, time-frequency transform other than the STFT may also be used herein. As a result, as shown by the following Formula (5), the third waveform function A5 in the temporal domain including the temporal intensity waveform function $a'_n(t)$ and the temporal phase waveform function $\phi'_n(t)$ is obtained. Here, in the first cycle, n=1.

[Formula 5]

$$\sqrt{a'_n(t)}\exp\{i\phi'_n(t)\} \tag{5}$$

Figure 15A:
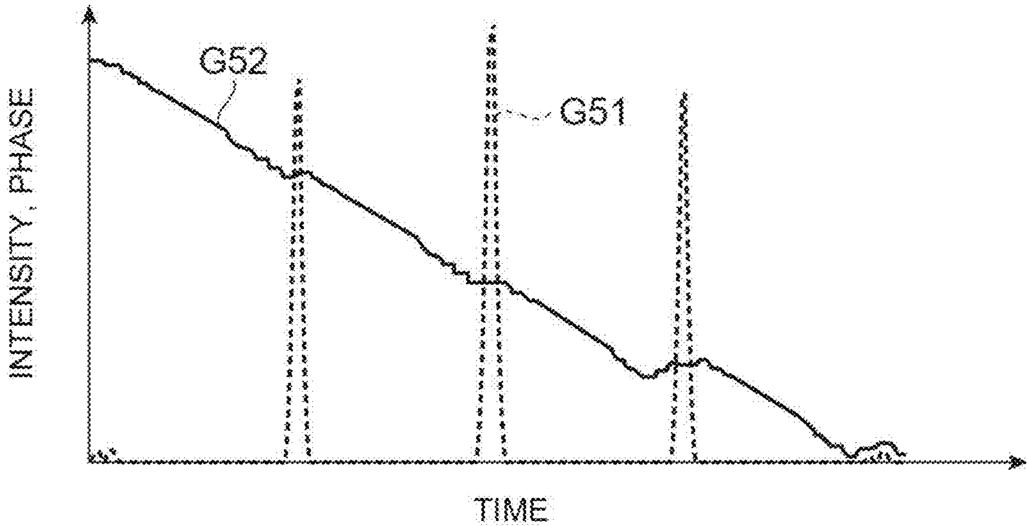
FIG. 15A is a graph schematically showing a temporal intensity waveform function and a temporal phase waveform function of a third waveform function in the first cycle, which has been subjected to inverse STFT from the intensity spectrogram and the phase spectrogram shown in FIGS. 14C and 14D.

FIG. 15A is a graph schematically showing the temporal intensity waveform function $a'_1(t)$ and the temporal phase waveform function $\phi'_1(t)$ of the third waveform function A5 in the first cycle, which has been subjected to inverse STFT from the intensity spectrogram A43 and the phase spectrogram A42 shown in FIGS. 14C and 14D. In FIG. 15A, a graph G51 shows the temporal intensity waveform function a'1(t), and a graph G52 shows the temporal phase waveform function $\phi_1(t)$. The horizontal axis indicates time, and the vertical axis indicates the intensity value of the temporal intensity waveform function or the phase value of the temporal phase waveform function.

Then, the inverse Fourier transform unit 33 performs an inverse Fourier transform from the temporal domain to the frequency domain on the third waveform function A5 (arrow B5 in the diagram, third transform step). As a result, as shown by the following Formula (6), a fourth waveform function A6 in the frequency domain including an intensity spectrum function $A'_n(\omega)$ and a phase spectrum function $\Phi'_n(\omega)$ is obtained. Here, in the first cycle, n=1.

[Formula 6]

$$\sqrt{A'_n(\omega)}\exp\{i\Phi'_n(\omega)\} \tag{6}$$

Figure 15B:
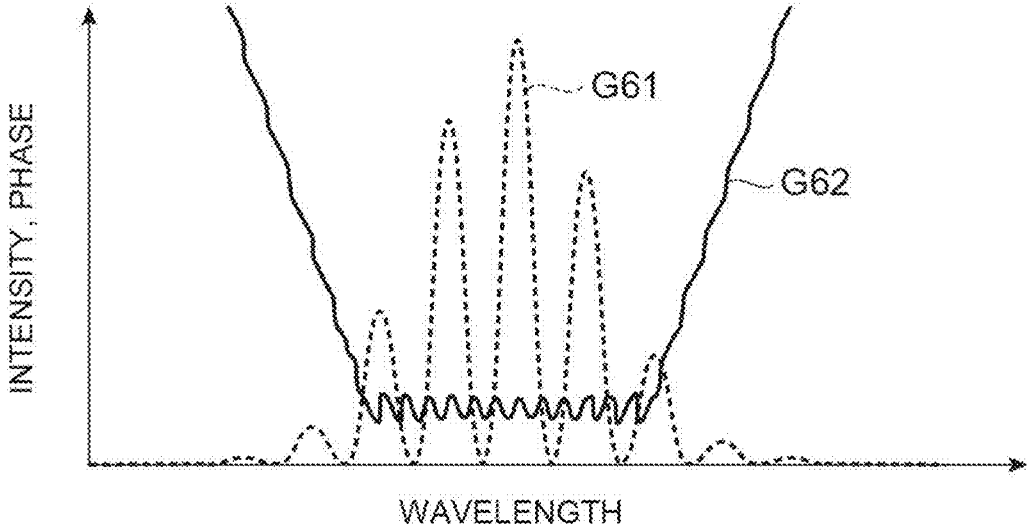
FIG. 15B is a graph schematically showing an intensity spectrum function and a phase spectrum function of a fourth waveform function in the first cycle, which has been subjected to inverse Fourier transform from the third waveform function shown in FIG. 15A.

FIG. 15B is a graph schematically showing the intensity spectrum function $A'_1(\omega)$ and the phase spectrum function $\Phi'_1(\omega)$ of the fourth waveform function A6 in the first cycle, which has been subjected to inverse Fourier transform from the third waveform function A5 shown in FIG. 15A. In FIG. 15B, a graph G61 shows the intensity spectrum function $A'_1(\omega)$, and a graph G62 shows the phase spectrum function Φ'1(ω). The horizontal axis indicates wavelength, and the vertical axis indicates the intensity value of the intensity spectrum function or the phase value of the phase spectrum function.

Thereafter, the phase pattern generation unit 23 replaces the phase spectrum function $\Phi_1(\omega)$ of the first waveform function A2 with the phase spectrum function $\Phi'_1(\omega)$ of the fourth waveform function while constraining the intensity spectrum function $A_0(\omega)$ of the first waveform function A2 (that is, setting is made to satisfy $\Phi_2(\omega)=\varphi'_1(\omega)$ of the first waveform function A2. See the arrow B6 in the diagram). Then, the operations of the Fourier transform unit 31, the spectrogram transform unit 321, the spectrogram replacement unit 322, the spectrogram inverse transform unit 323, and the inverse Fourier transform unit 33 described above are repeated N times until the evaluation value indicating the degree of match between the intensity spectrogram A41 and the target intensity spectrogram A43 converges. Thus, in the phase pattern generation unit 23, the Fourier transform unit 31, the spectrogram transform unit 321, the spectrogram replacement unit 322, the spectrogram inverse transform unit 323, and the inverse Fourier transform unit 33 repeatedly operate in this order while constraining the intensity spectrum function $A_0(\omega)$ of the first waveform function A2 and replacing the phase spectrum function $\Phi_{n+1}(\omega)$ of the first waveform function A2 in the (n+1)-th cycle with the phase spectrum function $\Phi'_n(\omega)$ of the fourth waveform function in the n-th cycle.

Figure 16A:
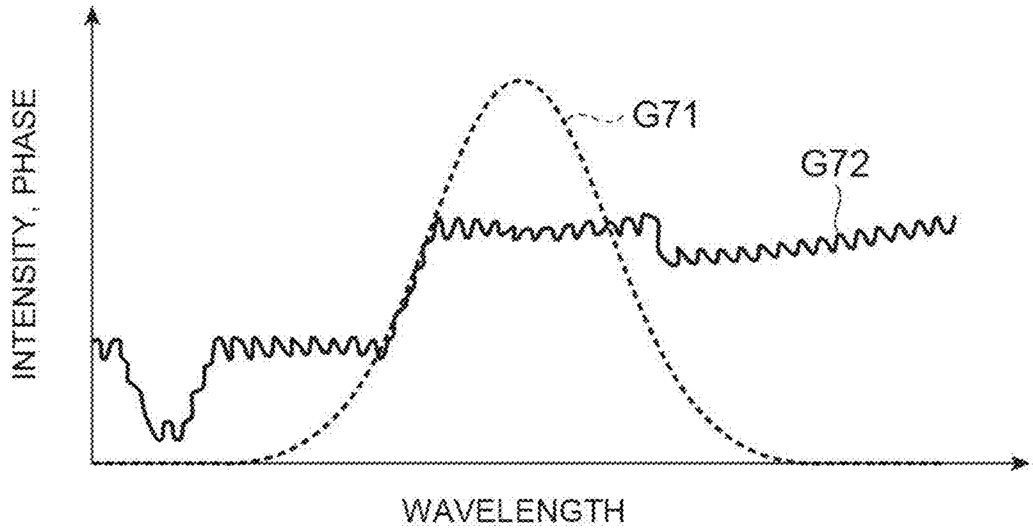
FIG. 16A is a graph schematically showing the intensity spectrum function and the phase spectrum function of the first waveform function in the third cycle (n=3) after FIG. 15B.
Figure 16B:
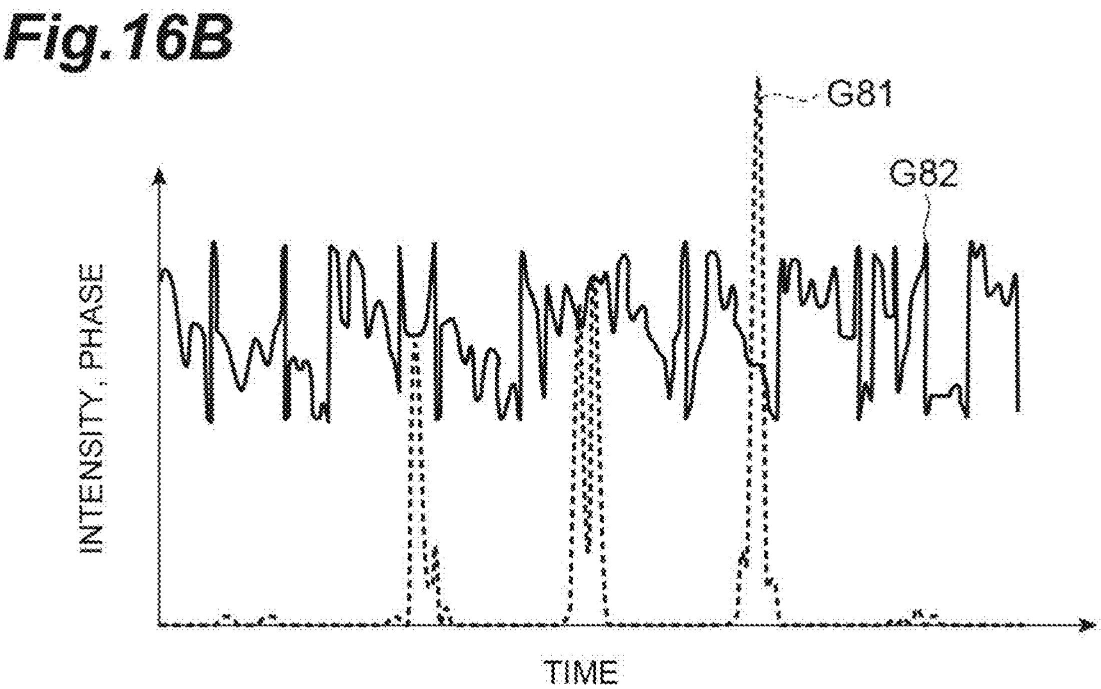
FIG. 16B is a graph schematically showing the temporal intensity waveform function and the temporal phase waveform function of the second waveform function in the third cycle, which has been Fourier-transformed from the first waveform function shown in FIG. 16A.
Figures 17A, 17B, 17C, 17D:
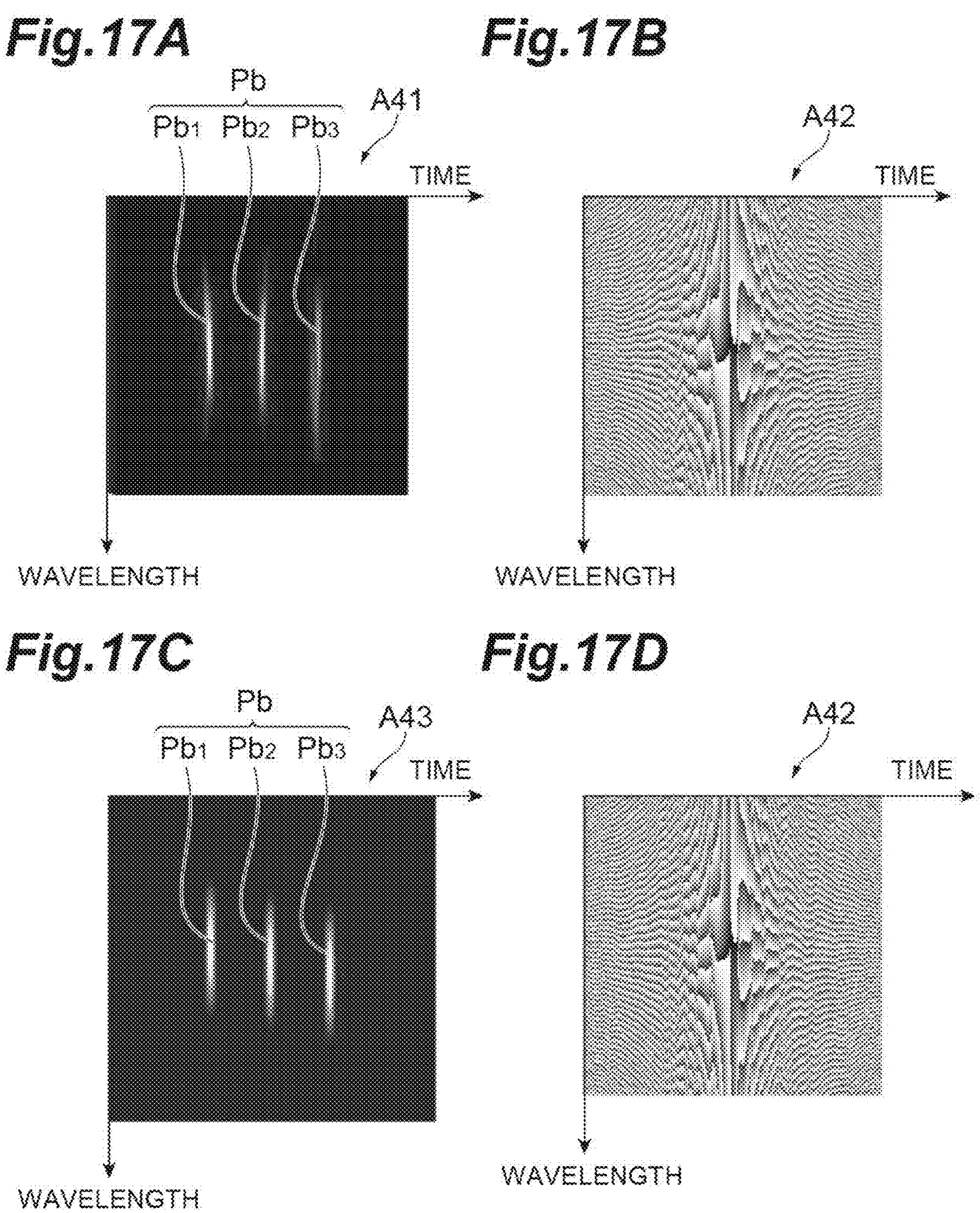
FIGS. 17A and 17B are diagrams respectively showing an intensity spectrogram and a phase spectrogram in the third cycle transformed from the second waveform function shown in FIG. 16B.
FIG. 17C is a diagram showing an intensity spectrogram in the third cycle.
FIG. 17D is a diagram showing a constrained phase spectrogram in the third cycle.
Figure 18A:
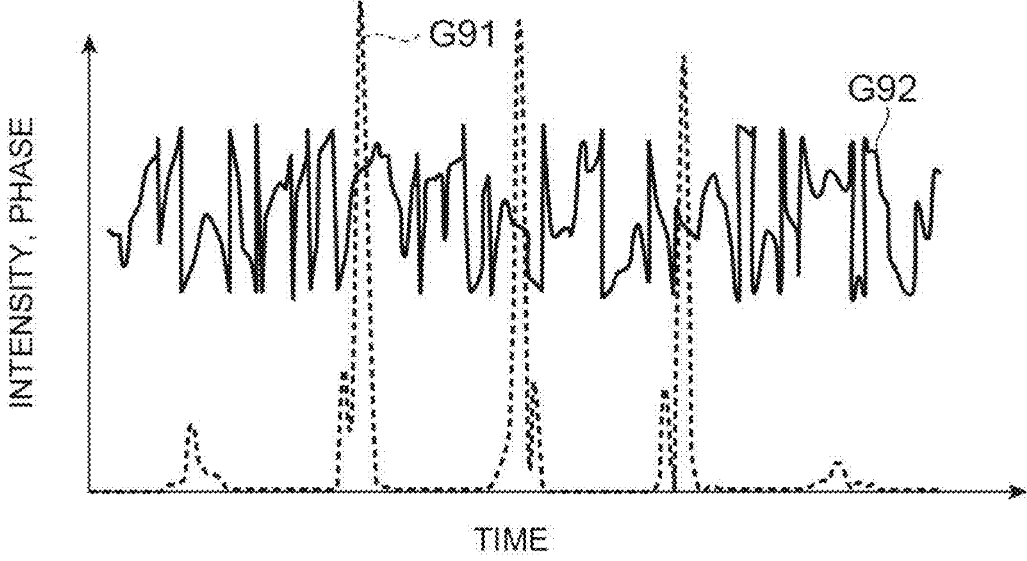
FIG. 18A is a graph schematically showing the temporal intensity waveform function and the temporal phase waveform function of the third waveform function in the third cycle, which has been subjected to inverse STFT from the intensity spectrogram and the phase spectrogram shown in FIGS. 17C and 17D.
Figure 18B:
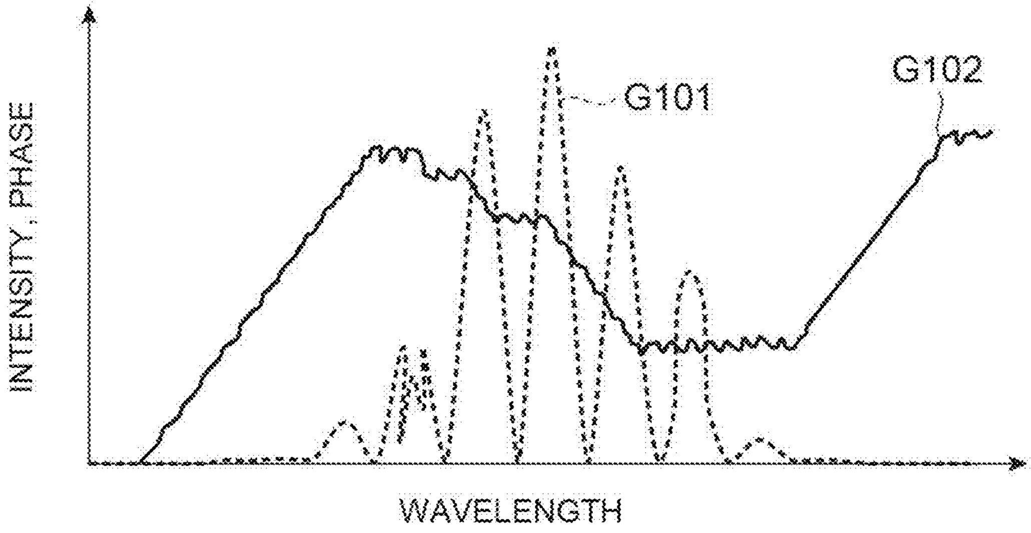
FIG. 18B is a graph schematically showing the intensity spectrum function and the phase spectrum function of the fourth waveform function in the third cycle, which has been subjected to inverse Fourier transform from the third waveform function shown in FIG. 18A.

FIG. 16A is a graph schematically showing the intensity spectrum function $A_0(\omega)$ (graph G71) and the phase spectrum function $\phi_3(\omega)$ (graph G72) of the first waveform function A2 in the third cycle (n=3) after FIG. 15B. It can be seen that the waveform of the phase spectrum function $\Phi_3(\omega)$ has changed from the first cycle. FIG. 16B is a graph schematically showing the temporal intensity waveform function $a_3(t)$ (graph G81) and the temporal phase waveform function $\Phi_3(t)$ (graph G82) of the second waveform function A3 in the third cycle, which has been Fourier-transformed from the first waveform function A2 shown in FIG. 16A. FIGS. 17A and 17B are diagrams respectively showing the intensity spectrogram A41 and the phase spectrogram A42 in the third cycle transformed from the second waveform function A3 shown in FIG. 16B. It can be seen that the three optical pulses $Pb_1$ to $Pb_3$ having time differences therebetween and having different center wavelengths start to be generated. FIG. 17C is a diagram showing the intensity spectrogram A43 in the third cycle, which is the same as the intensity spectrogram A43 in the first cycle shown in FIG. 14C. FIG. 17D is a diagram showing the constrained phase spectrogram A42 in the third cycle, which is the same as the phase spectrogram A42 in FIG. 17B. FIG. 18A is a graph schematically showing the temporal intensity waveform function $a'_3(t)$ (graph G91) and the temporal phase waveform function $\phi'_3(t)$ (graph G92) of the third waveform function A5 in the third cycle, which has been subjected to inverse STFT from the intensity spectrogram A43 and the phase spectrogram A42 shown in FIGS. 17C and 17D. FIG. 18B is a graph schematically showing the intensity spectrum function $A'_3(\omega)$ (graph G101) and the phase spectrum function $\Phi'_3(\omega)$ (graph G102) of the fourth waveform function A6 in the third cycle, which has been subjected to inverse Fourier transform from the third waveform function A5 shown in FIG. 18A.

By the repeated operations described above, the phase spectrum function $\Phi'_n(\omega)$ is modified so that the intensity spectrogram A41 gradually approaches the intensity spectrogram A43. Finally, the phase spectrum function $\Phi'_n(\omega)$ included in the fourth waveform function A6 becomes a desired spectral phase solution $\Phi_{result}(\omega)$. This spectral phase solution $\Phi_{result}(\omega)$ is provided to the data generation unit 34.

The data generation unit 34 calculates a phase pattern (for example, a computer-generated hologram) for applying to the optical pulse train Pb the spectral phase and/or the spectral intensity based on the spectral phase solution $\Phi_{result}(\omega)$ calculated by the phase pattern generation unit 23.

The phase pattern generation unit 23 performs the above-described repeated calculations and phase pattern calculation for each target intensity spectrogram A43 and for each of the plurality of initial phase spectrum functions $\Phi_0(\omega)$ stored in the storage unit 24. The phase pattern generation unit 23 may perform the repeated calculations and the phase pattern calculation sequentially for each initial phase spectrum function $\Phi_0(\omega)$, or may perform the repeated calculations and the phase pattern calculation in parallel for the plurality of initial phase spectrum functions $\Phi_0(\omega)$.

FIG. 19 is a flowchart showing an optical pulse train generation method according to the present embodiment. This optical pulse train generation method is a method for generating the optical pulse train Pb, and is appropriately realized by using the optical pulse train generation device 1 described above.

As shown in FIG. 19, first, a plurality of phase patterns PT are prepared (preparation step ST1). As described above, each of the plurality of phase patterns PT is a phase pattern for forming, from the first optical pulse Pa, the optical pulse train Pb including a plurality of second optical pulses having time differences therebetween and having different center wavelengths (for example, the second optical pulses $Pb_1$ to $Pb_3$ shown in FIGS. 6A and 6B). Then, between the plurality of phase patterns PT, one or both of the first characteristic regarding the first optical pulse Pa and the second characteristic regarding the optical pulse train Pb are different. In the preparation step ST1, the plurality of phase patterns PT are prepared in association with the first characteristic and the second characteristic. In the preparation step ST1, a plurality of phase pattern groups F shown in FIG. 9 may be prepared. This preparation step ST1 may be performed by the phase pattern generation unit 23. The plurality of prepared phase patterns are stored in the storage unit 24.

Specifically, the preparation step ST1 includes a first transform step ST11, a second transform step ST12, a third transform step ST13, and a data generation step ST14. In the first transform step ST11, the Fourier transform unit 31 transforms the first waveform function A2 in the frequency domain including the intensity spectrum function $A_0(\omega)$ and the phase spectrum function $\Phi_n(\omega)$ into the second waveform function A3 in the temporal domain including the temporal intensity waveform function $a_n(t)$ and the temporal phase waveform function $\phi_n(t)$.

In the second transform step ST12, the function transform unit 32 calculates the third waveform function A5 in the temporal domain, which includes the temporal intensity waveform function $a'_n(t)$ and the temporal phase waveform function $\phi'_n(t)$ and corresponds to the target intensity spectrogram A43 generated in advance, from the second waveform function A3. The details of the second transform step ST12 are the same as the operation of the function transform unit 32 described above. In the third transform step ST13, the inverse Fourier transform unit 33 transforms the third waveform function A5 into the fourth waveform function A6 in the frequency domain including the intensity spectrum function $A'_n(\omega)$ and the phase spectrum function $\Phi'_n(\omega)$. In the preparation step ST1, the first transform step ST11, the second transform step ST12, and the third transform step ST13 are repeatedly performed while replacing the first waveform function A2 with the fourth waveform function A6. In addition, in the first transform step ST11 at the beginning of the repeated operations, one of the plurality of initial phase spectrum functions $A_0(\omega)$ is set as the phase spectrum function of the first waveform function A2. Then, in the data generation step ST14, the data generation unit 34 generates phase pattern data based on the phase spectrum function $\Phi'_n(\omega)$ of the fourth waveform function A6 obtained after the repeated operations. In the preparation step ST1, the above-described repeated calculations are performed for all of the plurality of initial phase spectrum functions $A_0(\omega)$, and in the data generation step ST14, phase pattern data is generated (step ST15). In this manner, a plurality of phase patterns respectively corresponding to the plurality of initial phase spectrum functions $A_0(\omega)$ are obtained. In addition, in the preparation step ST1, the above-described repeated calculations are performed for all of the target intensity spectrograms A43, and in the data generation step ST14, phase pattern data is generated (step ST16). In this manner, a plurality of sets of phase patterns respectively corresponding to the plurality of target intensity spectrograms A43 are obtained.

Then, in response to the input from the user, a first characteristic regarding the first optical pulse Pa and a second characteristic regarding the optical pulse train Pb are set (characteristic setting step ST2). Specifically, first, the user selects one index value from two or more index values through the input unit 26 (step ST21). Then, the second characteristic of the optical pulse train Pb obtained by each phase pattern PT of the phase pattern group F that corresponds to the one index value selected by the user's input is presented to the user by the presentation unit 28 (presentation step ST22). Then, the user selects one value, through the input unit 26, from the plurality of values regarding the second characteristic presented by the presentation unit 28 (step ST23).

Then, the first optical pulse Pa is output from the light source 2 (light output step ST3). Then, using the SLM 14 that displays one of the plurality of phase patterns PT, the optical pulse train Pb is formed from the first optical pulse Pa (pulse forming step ST4). In the pulse forming step ST4, one phase pattern PT corresponding to the first characteristic and the second characteristic set in the characteristic setting step ST2, among the plurality of phase patterns PT, is displayed on the SLM 14.

The effects obtained by the optical pulse train generation device 1 and the optical pulse train generation method of the present embodiment described above will be described. In the present embodiment, when the user performs an input operation on the characteristic setting unit 27 in the characteristic setting step ST2, the first characteristic regarding the first optical pulse Pa and the second characteristic regarding the optical pulse train Pb are set. Then, one phase pattern PT corresponding to the set first characteristic and second characteristic, among the plurality of phase patterns PT, is displayed on the SLM 14. When the first optical pulse Pa is output from the light source 2, the optical pulse train Pb is formed from the first optical pulse Pa by the pulse forming unit 3 having the SLM 14. Therefore, according to the optical pulse train generation device 1 and the optical pulse train generation method of the present embodiment, the user can easily obtain the optical pulse train Pb having a temporal intensity waveform and wavelength components required by the user.

As described above, the first characteristic regarding the first optical pulse Pa may include at least one characteristic selected from the group consisting of the center wavelength of the first optical pulse Pa, the bandwidth of the first optical pulse Pa, the spectral shape of the first optical pulse Pa, the spectral phase of the first optical pulse Pa, and the type of the light source 2. In this case, the phase pattern PT suitable for the first optical pulse Pa output from the light source 2 can be selected from the plurality of phase patterns PT. Therefore, the user can more easily obtain the optical pulse train Pb having a temporal intensity waveform and wavelength components required by the user.

As described above, the second characteristic regarding the optical pulse train Pb may include at least one characteristic selected from the group consisting of the number of a plurality of second optical pulses (second optical pulses $Pb_1$ to $Pb_3$ in the examples of FIGS. 6A and 6B), a time interval between the plurality of second optical pulses, a variation in time interval between the plurality of second optical pulses, the center wavelength of each of the plurality of second optical pulses, a center wavelength difference between the plurality of second optical pulses, the bandwidth of each of the plurality of second optical pulses, a variation in the bandwidth of each of the plurality of second optical pulses, a peak intensity ratio between the plurality of second optical pulses, and a variation in peak intensity between the plurality of second optical pulses. In this case, the phase pattern PT for realizing more accurately the optical pulse train Pb having a temporal intensity waveform and wavelength components required by the user can be selected from the plurality of phase patterns PT. Therefore, the user can more easily obtain the optical pulse train Pb having a temporal intensity waveform and wavelength components required by the user.

As in the present embodiment, the storage unit 24 may store a plurality of phase pattern groups F, and each of the plurality of phase pattern groups F includes two or more phase patterns PT that are parts of the plurality of phase patterns PT and may have a one-to-one correspondence with each of two or more index values (center wavelength differences $\Delta\lambda_1$ to $\Delta\lambda_3$ in the example of FIG. 9) regarding the second characteristic. The characteristic setting unit 27 may include the presentation unit 28 that presents, to the user, the second characteristic of the optical pulse train Pb obtained by each phase pattern PT of the phase pattern group F corresponding to one index value selected from the two or more index values by the user's input. The SLM 14 may display the phase pattern PT corresponding to one second characteristic selected by the user among the second characteristics presented by the presentation unit 28. Similarly, in the preparation step ST1, a plurality of phase pattern groups F may be prepared. The characteristic setting step ST2 may include the presentation step ST22 for presenting, to the user, the second characteristic of the optical pulse train Pb obtained by each phase pattern PT of the phase pattern group F corresponding to one index value selected by the user's input among two or more index values. In the pulse forming step ST4, the phase pattern PT corresponding to one second characteristic selected by the user among the second characteristics presented in the presentation step ST22 may be displayed on the SLM 14. In this case, among the two or more phase patterns PT that can realize a temporal intensity waveform and wavelength components that are the same as or close to the temporal intensity waveform and wavelength components required by the user, the optimal phase pattern PT can be selected by the user himself or herself. Therefore, the user can more easily obtain the optical pulse train Pb having a temporal intensity waveform and wavelength components required by the user.

The optical pulse train generation device 1 of the present embodiment includes the phase pattern generation unit 23 that generates a plurality of phase patterns PT. The phase pattern generation unit 23 repeatedly performs the operations of the Fourier transform unit 31, the function transform unit 32, and the inverse Fourier transform unit 33 for each of the plurality of phase patterns PT while replacing the first waveform function A2 with the fourth waveform function A6, and generates each of the plurality of phase patterns PT based on the phase spectrum function $\Phi_{result}(\omega)$ of the fourth waveform function A6 obtained after the repeated operations. Then, repeated calculations are performed between the frequency domain and the temporal domain while calculating the third waveform function A5 in the temporal domain corresponding to the target intensity spectrogram A43 generated in advance by the function transform unit 32. As a result, compared with the technique described in Patent Literature 1, the time required to calculate the phase pattern PT for approximating the temporal intensity waveform and wavelength components of the optical pulse train Pb to desired ones can be shortened. In addition, it is possible to improve the calculation accuracy of the phase pattern PT.

As in the present embodiment, the second transform step ST12 may include a step of transforming the second waveform function A3 into the intensity spectrogram A41 and the phase spectrogram A42, a step of replacing the intensity spectrogram A41 with the target intensity spectrogram A43 and constraining the phase spectrogram A42, and a step of transforming the replaced intensity spectrogram A43 and the constrained phase spectrogram A42 into the third waveform function A5. Similarly, the function transform unit 32 may include: a unit that transforms the second waveform function A3 into the intensity spectrogram A41 and the phase spectrogram A42, that is, the spectrogram transform unit 321; a unit that replaces the intensity spectrogram A41 with the target intensity spectrogram A43 and constrains the phase spectrogram A42, that is, the spectrogram replacement unit 322; and a unit that transforms the replaced intensity spectrogram A43 and the constrained phase spectrogram A42 into the third waveform function A5, that is, the spectrogram inverse transform unit 323. For example, with such a configuration, it is possible to obtain the phase pattern PT for accurately realizing light having a desired temporal intensity waveform and wavelength components.

[Generation of Target Intensity Spectrogram]

Figure 20:
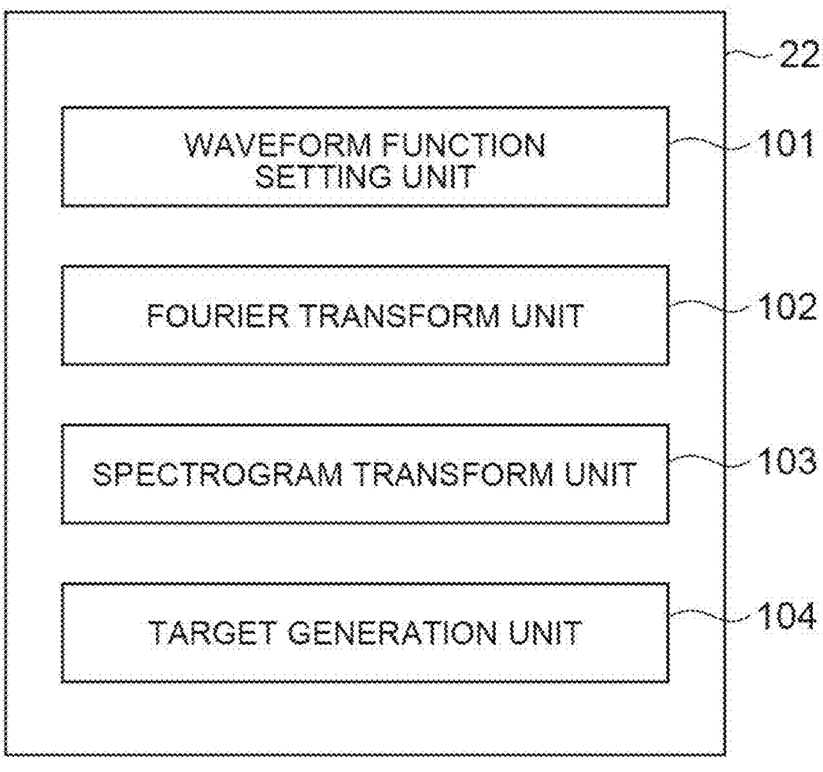
FIG. 20 is a block diagram showing the functional configuration of a spectrogram setting unit.

Next, a procedure for generating the target intensity spectrogram A43 in the spectrogram setting unit 22 will be described. FIG. 20 is a block diagram showing the functional configuration of the spectrogram setting unit 22. The spectrogram setting unit 22 generates the target intensity spectrogram A43 regarding the optical pulse train Pb including a plurality of optical pulses (for example, the above-described optical pulses $Pb_1$ to $Pb_3$) having time differences therebetween and having different center wavelengths. As shown in FIG. 20, the spectrogram setting unit 22 includes a waveform function setting unit 101, a Fourier transform unit 102, a spectrogram transform unit 103, and a target generation unit 104.

Figure 21A:
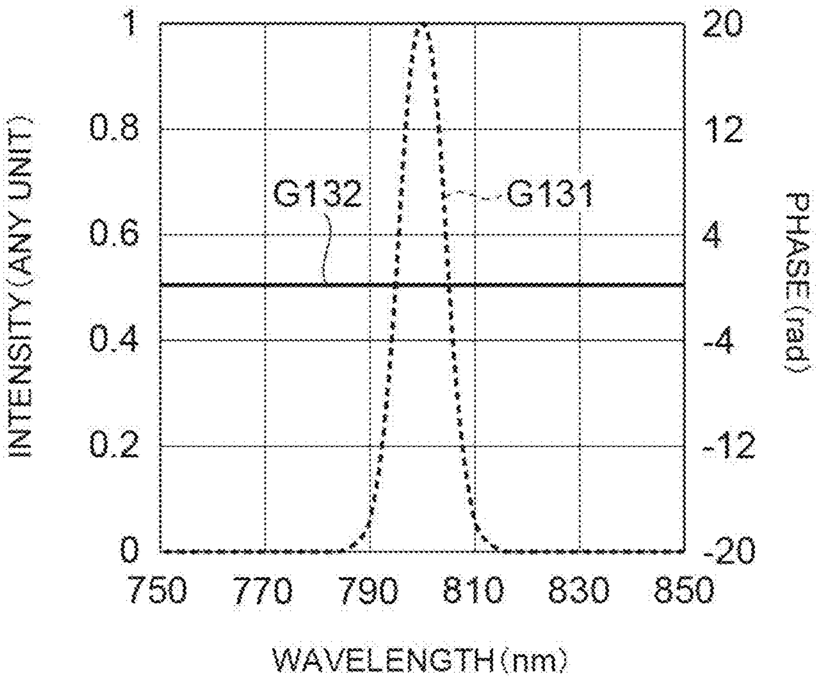
FIG. 21A is a graph showing, as an example of a target waveform function, an intensity spectrum function and a phase spectrum function of a target waveform function for one optical pulse shown in FIGS. 6A and 6B.

The waveform function setting unit 101 sets a target waveform function in the frequency domain, which includes $a_n$ intensity spectrum function and a phase spectrum function, for each optical pulse. For example, the waveform function setting unit 101 sets a target waveform function for the optical pulse $Pb_1$, sets another target waveform function for the optical pulse $Pb_2$, and sets still another target waveform function for the optical pulse $Pb_3$. For example, the parameters of the target waveform function are as follows.

a) Shape (for example, Gaussian) of the intensity spectrum function of each optical pulse
b) Amount of spectral energy of the intensity spectrum function of each optical pulse c) Bandwidth (full width at half maximum) Xs of the intensity spectrum function of each optical pulse
d) Center wavelength of the intensity spectrum function of each optical pulse
e) Phase spectrum function of each optical pulse In addition, when the spectral phase of each optical pulse is linear with respect to frequency, the slope of the linear function corresponds to the amount of time shift of each optical pulse. FIG. 21A is a graph showing, as an example of the target waveform function, an intensity spectrum function G131 and a phase spectrum function G132 of the target waveform function for the optical pulse $Pb_2$ shown in FIGS. 6A and 6B. In FIG. 21A, the horizontal axis indicates wavelength (nm), and the vertical axis indicates the intensity value (any unit) of the intensity spectrum function G131 and the phase value (rad) of the phase spectrum function G132. This example is a target waveform function for the optical pulse $Pb_2$ located at the center among the three optical pulses $Pb_1$ to $Pb_3$ that are equally spaced in time from each other, so that the slope of the phase spectrum function G132 (that is, the amount of time shift) is zero.

Figure 21B:
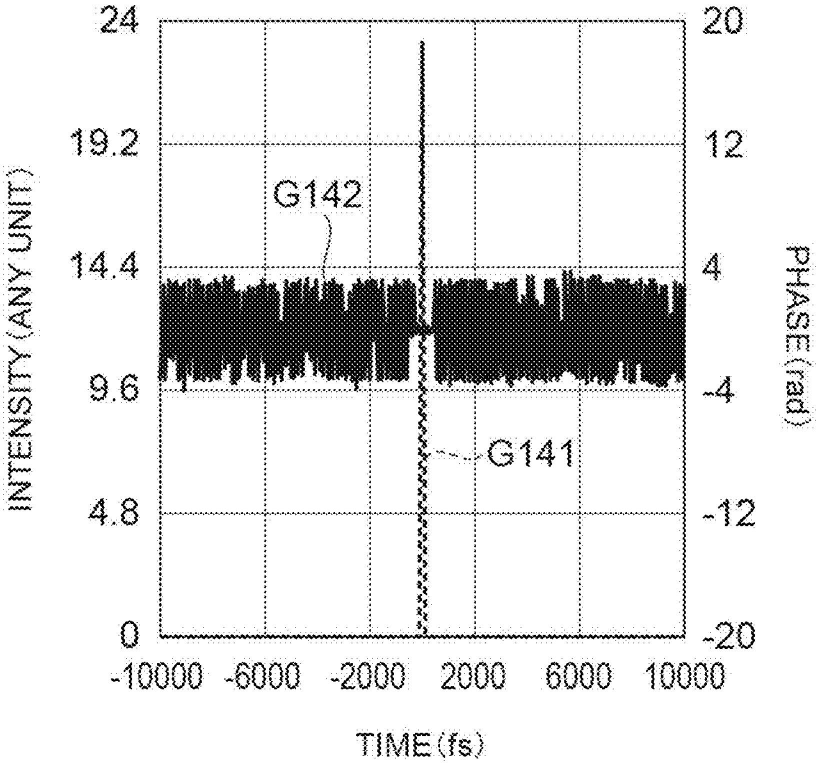
FIG. 21B is a graph showing, as an example of a waveform function in the temporal domain, a temporal intensity waveform function and a temporal phase waveform function generated from the target waveform function shown in FIG. 21A.

The Fourier transform unit 102 transforms the target waveform function of each of the plurality of optical pulses into a waveform function in the temporal domain including a temporal intensity waveform function and a temporal phase waveform function. FIG. 21B is a graph showing, as an example of the waveform function in the temporal domain, a temporal intensity waveform function G141 and a temporal phase waveform function G142 generated from the target waveform function shown in FIG. 21A. In FIG. 21B, the horizontal axis indicates time (fs), and the vertical axis indicates the intensity value (any unit) of the temporal intensity waveform function G141 and the phase value (rad) of the temporal phase waveform function G142.

Figure 22A:
FIG. 22A is a diagram showing, as an example of an intensity spectrogram, an intensity spectrogram generated from the waveform function shown in FIG. 21B.

The spectrogram transform unit 103 generates an intensity spectrogram from the time-domain waveform function of each of the plurality of optical pulses. FIG. 22A is a diagram showing, as an example of the intensity spectrogram, an intensity spectrogram generated from the waveform function shown in FIG. 21B. In addition, the intensity spectrogram generation method and the definition of the spectrogram are the same as those described in the spectrogram transform unit 321 of the phase pattern generation unit 23 described above. In addition, also in the spectrogram transform unit 103, other time-frequency transforms (for example, wavelet transform) may be used without being limited to the STFT.

Figure 22B:
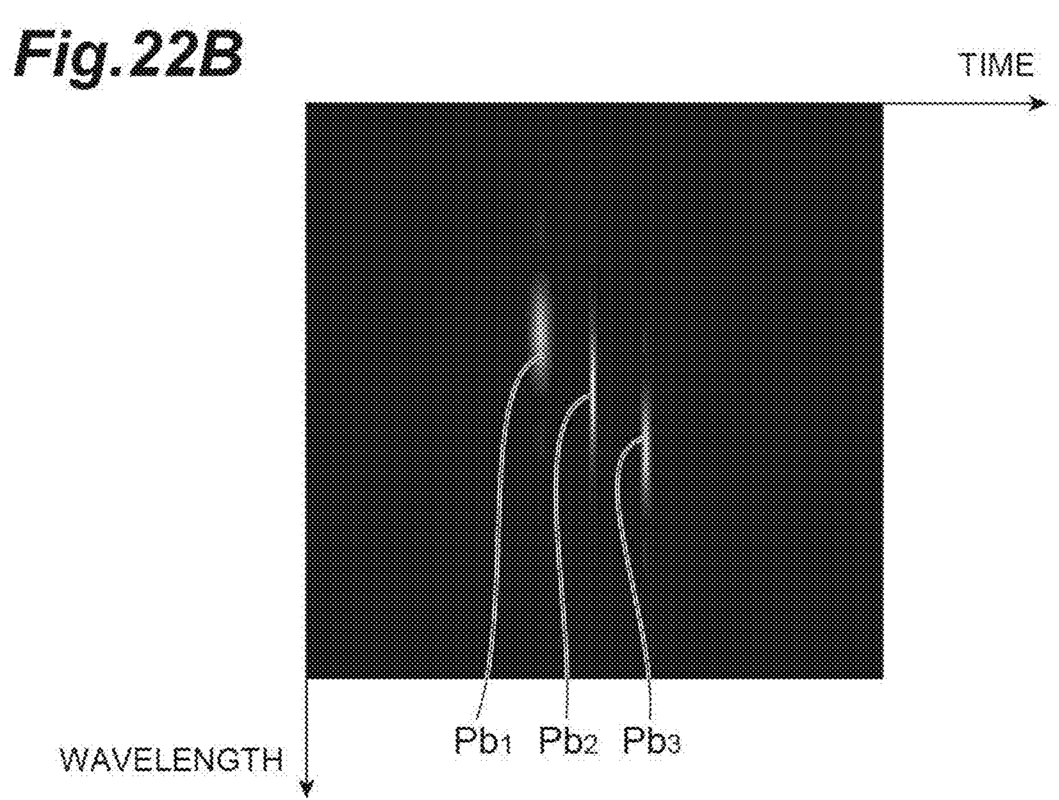
FIG. 22B is a diagram showing, as an example, an intensity spectrogram obtained by superimposing intensity spectrograms for three optical pulses on each other.

The target generation unit 104 generates the intensity spectrogram A43 by superimposing the intensity spectrograms of the plurality of optical pulses on each other. FIG. 22B is a diagram showing, as an example, the intensity spectrogram A43 obtained by superimposing intensity spectrograms for the three optical pulses $Pb_1$ to $Pb_3$ on each other. In addition, the target generation unit 104 may multiply the intensity spectrogram obtained by superimposing the intensity spectrograms of the plurality of optical pulses by a correction coefficient. The correction coefficient is, for example, a coefficient for approximating the spectral intensity distribution of the generated target intensity spectrogram A43 to the spectral intensity distribution of the optical pulse of the first optical pulse Pa.

Figure 23:
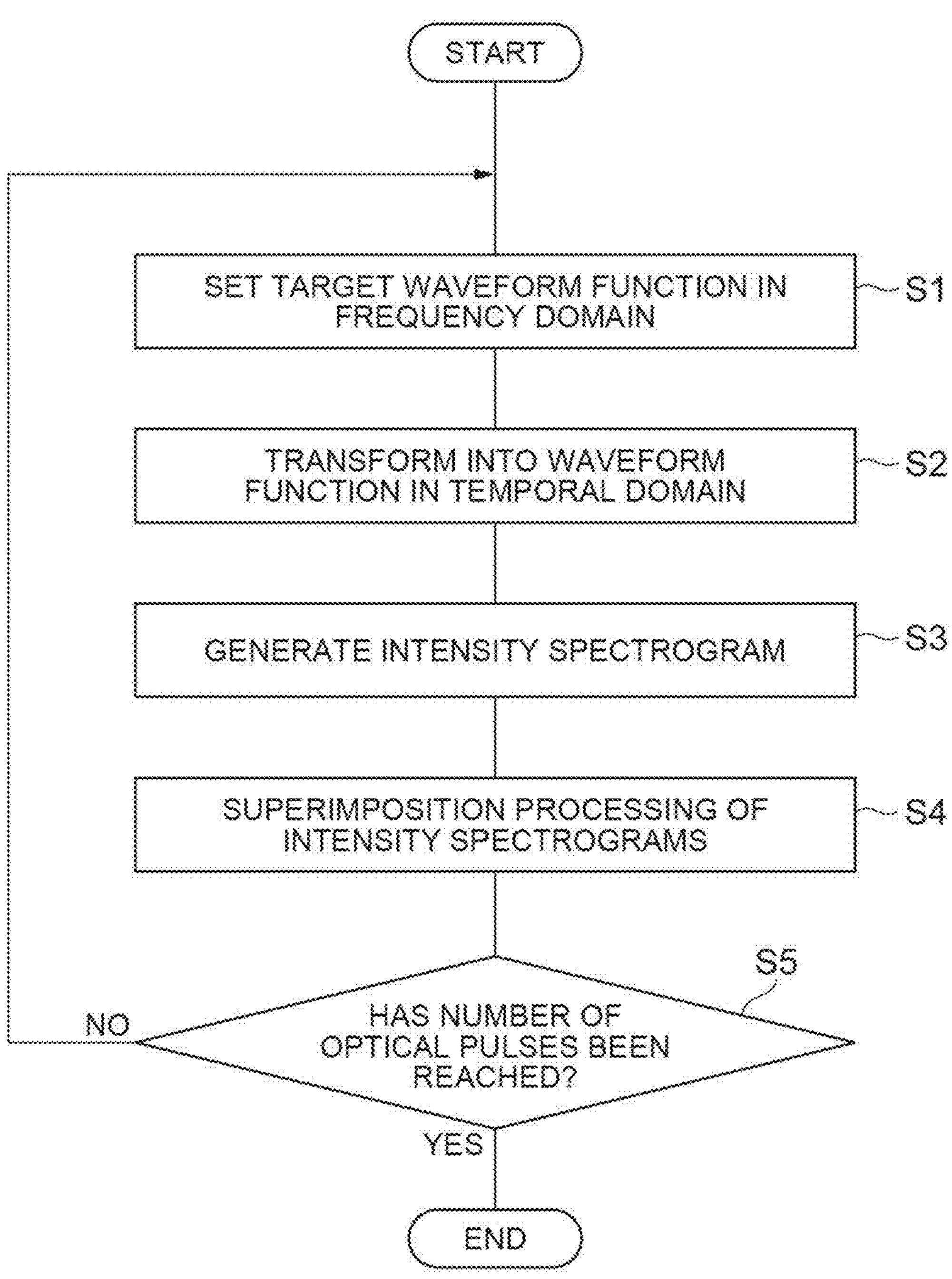
FIG. 23 is a flowchart showing a method for generating an intensity spectrogram.

FIG. 23 is a flowchart showing a method for generating the intensity spectrogram A43. The target intensity spectrogram generation program of the present embodiment causes a computer to execute the following steps.

First, in waveform function setting step S1, a target waveform function in the frequency domain including an intensity spectrum function and a phase spectrum function is set for one optical pulse among a plurality of optical pulses. In Fourier transform step S2, the target waveform function of the one optical pulse is transformed into a waveform function in the temporal domain including a temporal intensity waveform function and a temporal phase waveform function. In spectrogram transform step S3, an intensity spectrogram is generated from the waveform function in the temporal domain generated in the Fourier transform step S2. In target generation step S4, the intensity spectrogram generated in the spectrogram transform step S3 is superimposed on the target intensity spectrogram. The above-described waveform function setting step S1, Fourier transform step S2, spectrogram transform step S3, and target generation step S4 are repeated by the same number of repetitions as the number of optical pulses (step S5). As a result, the intensity spectrogram A43 is generated. In addition, without being limited to this example, for example, processes for a plurality of optical pulses may be performed at once in each of the waveform function setting step S1, Fourier transform step S2, and spectrogram transform step S3, and then the plurality of generated intensity spectrograms may be superimposed in the target generation step S4.

According to the spectrogram setting unit 22 described above, it is possible to appropriately generate the target intensity spectrogram A43 for making the center wavelength different for each of the plurality of pulses included in the optical pulse train Pb.

Figure 24:
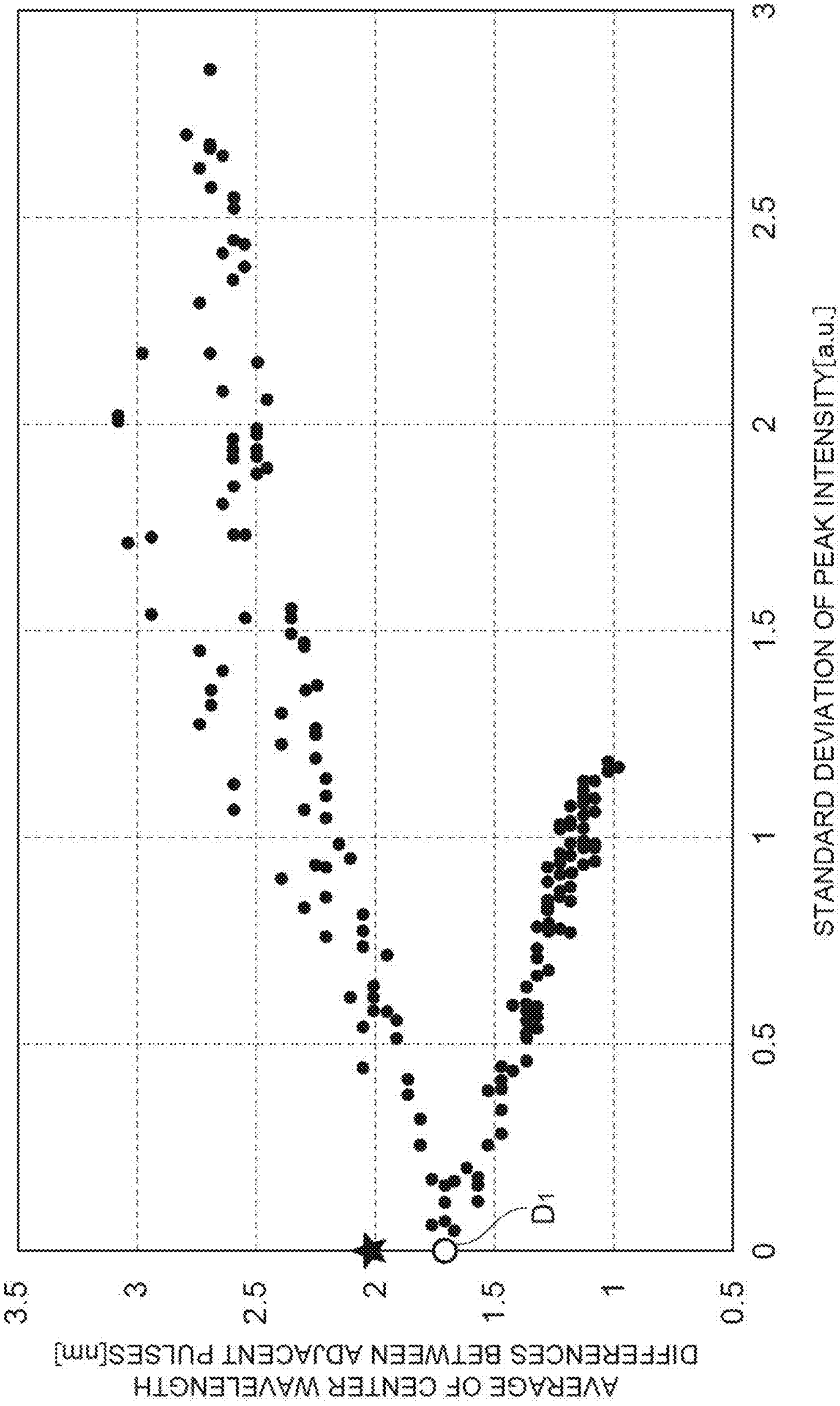
FIG. 24 is a graph obtained by plotting the relationship between a center wavelength difference between a plurality of pulses and a variation in peak intensity of a plurality of pulses of light, which is actually obtained by presenting data obtained using the target intensity spectrogram to the spatial light modulator, for each of a plurality of initial phase spectrum functions.
Figure 25:
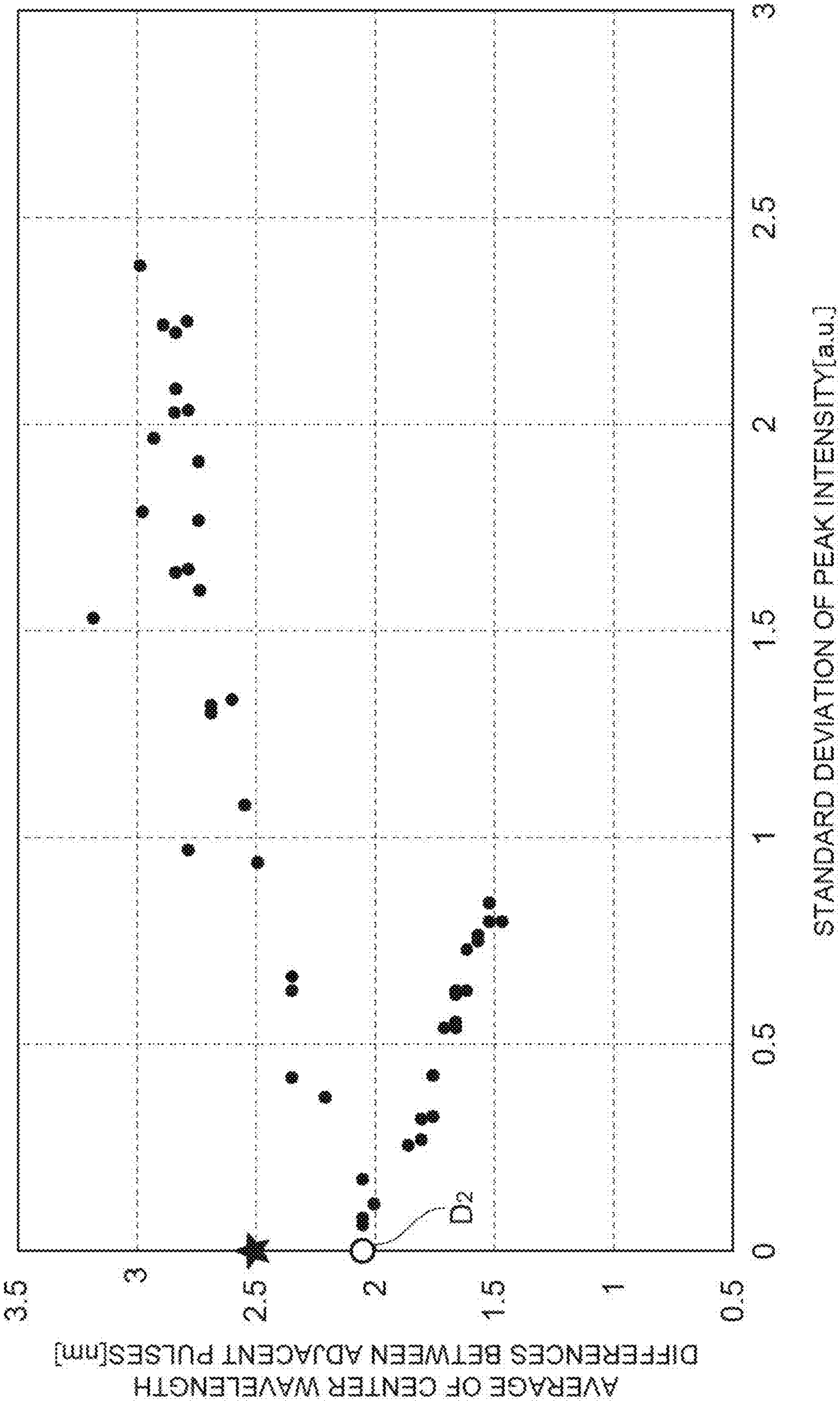
FIG. 25 is a graph obtained by plotting the relationship between a center wavelength difference between a plurality of pulses and a variation in peak intensity of a plurality of pulses of light, which is actually obtained by presenting data obtained using the target intensity spectrogram to the spatial light modulator, for each of a plurality of initial phase spectrum functions.
Figure 26:
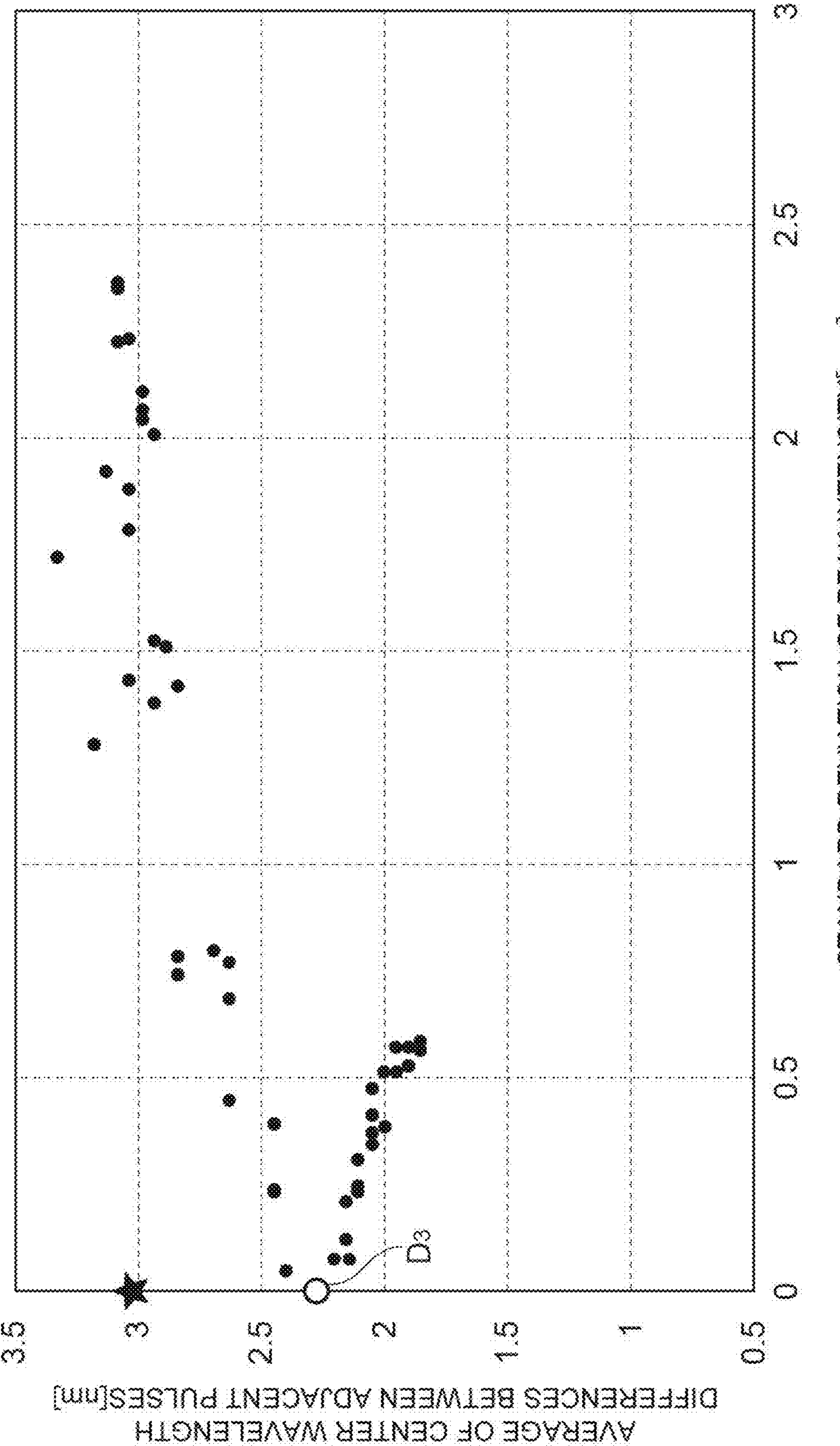
FIG. 26 is a graph obtained by plotting the relationship between a center wavelength difference between a plurality of pulses and a variation in peak intensity of a plurality of pulses of light, which is actually obtained by presenting data obtained using the target intensity spectrogram to the spatial light modulator, for each of a plurality of initial phase spectrum functions.

FIGS. 24 to 26 are graphs obtained by plotting the relationship between a center wavelength difference between a plurality of pulses and a variation in peak intensity of a plurality of pulses of light, which is actually obtained by presenting data obtained using the target intensity spectrogram A43 to the SLM 14, for each of a plurality of initial phase spectrum functions $\Phi_0(\omega)$. In FIGS. 24 to 26, the vertical axis indicates the average value (nm) of the center wavelength difference between a plurality of pulses, and the horizontal axis indicates the standard deviation (any unit) of the peak intensity of the plurality of pulses. FIG. 24 shows a case where the center wavelength difference between a plurality of pulses is set to 2 nm when generating the target intensity spectrogram A43. FIGS. 25 and 26 show cases where the center wavelength difference between a plurality of pulses is set to 2.5 nm and 3 nm, respectively, when generating the target intensity spectrogram A43. In addition, the set value of the center wavelength difference between a plurality of pulses is indicated by an asterisk in the diagrams.

Referring to FIGS. 24 to 26, it can be seen that the center wavelength difference between a plurality of pulses and the variation in peak intensity change depending on the initial phase spectrum function $\Phi_0(\omega)$. Then, it can be seen that the variation in peak intensity is minimized when the center wavelength difference reaches a predetermined value and the variation in peak intensity increases as the center wavelength difference is away from the value.

In addition, referring to FIGS. 24 to 26, it can be seen that the value of the center wavelength difference between a plurality of pulses when the variation in peak intensity is minimized is significantly smaller than the value of the center wavelength difference set when generating the target intensity spectrogram A43. For example, as shown in FIG. 24, when the center wavelength difference set when generating the target intensity spectrogram A43 is 2 nm, the value of the center wavelength difference between a plurality of pulses when the variation in peak intensity is minimized is 1.7 nm, which is 15% smaller than the set center wavelength difference (2 nm). In addition, as shown in FIG. 25, when the center wavelength difference set when generating the target intensity spectrogram A43 is 2.5 nm, the value of the center wavelength difference between a plurality of pulses when the variation in peak intensity is minimized is 2.1 nm, which is 16% smaller than the set center wavelength difference (2.5 nm). In addition, as shown in FIG. 26, when the center wavelength difference set when generating the target intensity spectrogram A43 is 3 nm, the value of the center wavelength difference between a plurality of pulses when the variation in peak intensity is minimized is 2.3 nm, which is 23% smaller than the set center wavelength difference (3 nm).

From this, it can be seen that, when the spectrogram setting unit 22 generates the target intensity spectrogram A43, the center wavelength difference between a plurality of optical pulses in the target intensity spectrogram A43 is preferably set to be larger than the target center wavelength difference between a plurality of optical pulses (for example, larger than 1.1 times the target center wavelength difference between a plurality of optical pulses). The target center wavelength difference between a plurality of optical pulses is input by the user through the input device 64 shown in FIG. 8, for example. By setting the center wavelength difference between a plurality of optical pulses in the target intensity spectrogram A43 in this manner, the center wavelength difference between a plurality of optical pulses in the optical pulse train Pb can be realized more accurately.

In addition, when the center wavelength difference between a plurality of optical pulses in the target intensity spectrogram A43 is set to be larger than the target center wavelength difference as described above, it is preferable that the center wavelength difference is smaller than a value obtained by dividing the wavelength band of the first optical pulse Pa to the SLM 14 by a value obtained by subtracting 1 from the number of pulses in the optical pulse train Pb. For example, when the number of pulses in the optical pulse train Pb is 3, it is preferable that the center wavelength difference between a plurality of optical pulses in the target intensity spectrogram A43 is smaller than ½ of the wavelength band of the first optical pulse Pa. By setting the center wavelength difference between a plurality of optical pulses in the target intensity spectrogram A43 in this manner, the center wavelength difference between a plurality of optical pulses in the optical pulse train Pb can be realized more accurately. For example, when the wavelength bandwidth of the spectrum of the first optical pulse Pa is 10 nm and the number of pulses in the optical pulse train Pb is 3, the upper limit of the set value of the center wavelength difference is 5 nm. In addition, the phase pattern group corresponding to each distribution shown in FIGS. 24 to 26 may be set to the phase pattern group F shown in FIG. 9. In this case, the index value of the phase pattern group F corresponding to the distribution shown in FIG. 24 is, for example, the center phase difference $\Delta\lambda_1$=1.7 nm (circle mark $D_1$ in the diagram). In addition, the index value of the phase pattern group F corresponding to the distribution shown in FIG. 25 is, for example, the center phase difference $\Delta\lambda_2$=2.1 nm (circle mark $D_2$ in the diagram). In addition, the index value of the phase pattern group F corresponding to the distribution shown in FIG. 26 is, for example, the center phase difference $\Delta\lambda_3$=2.3 nm (circle mark $D_3$ in the diagram).

Modification Examples

Figure 27:
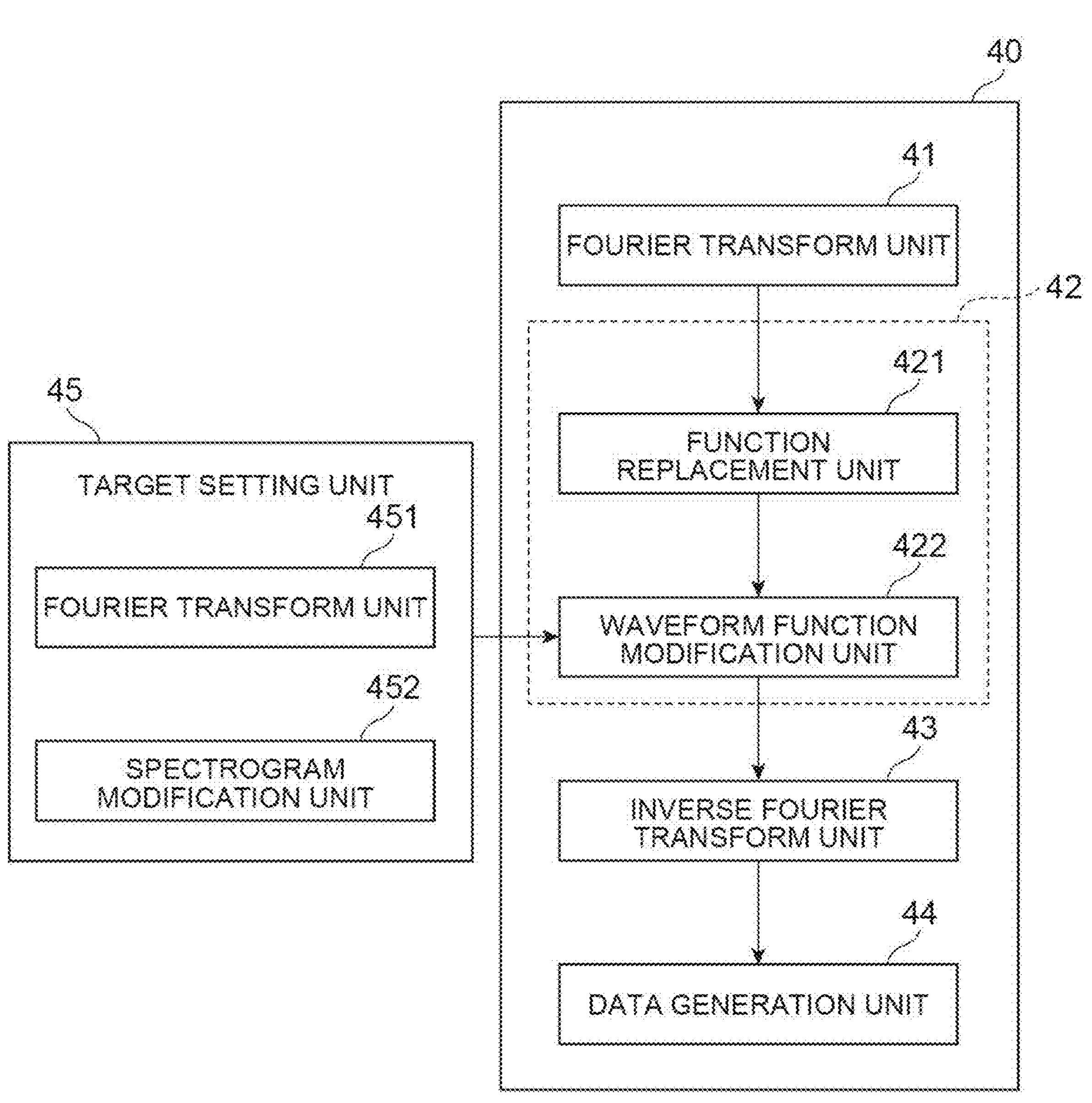
FIG. 27 is a block diagram showing the internal configuration of a target setting unit and a preliminary data generation unit according to a modification example.

Next, modification examples of the spectrogram setting unit 22 and the phase pattern generation unit 23 will be described. FIG. 27 is a block diagram showing the internal configuration of a target setting unit 45 and a preliminary data generation unit 40 according to a modification example. As shown in FIG. 27, the preliminary data generation unit 40 includes a Fourier transform unit 41 (first transform unit), a function transform unit 42 (second transform unit), an inverse Fourier transform unit 43 (third transform unit), and a data generation unit 44. The function transform unit 42 includes a function replacement unit 421 and a waveform function modification unit 422. In addition, the target setting unit 45 includes a Fourier transform unit 451 and a spectrogram modification unit 452. The functions of these components will be detailed later.

Figure 28:
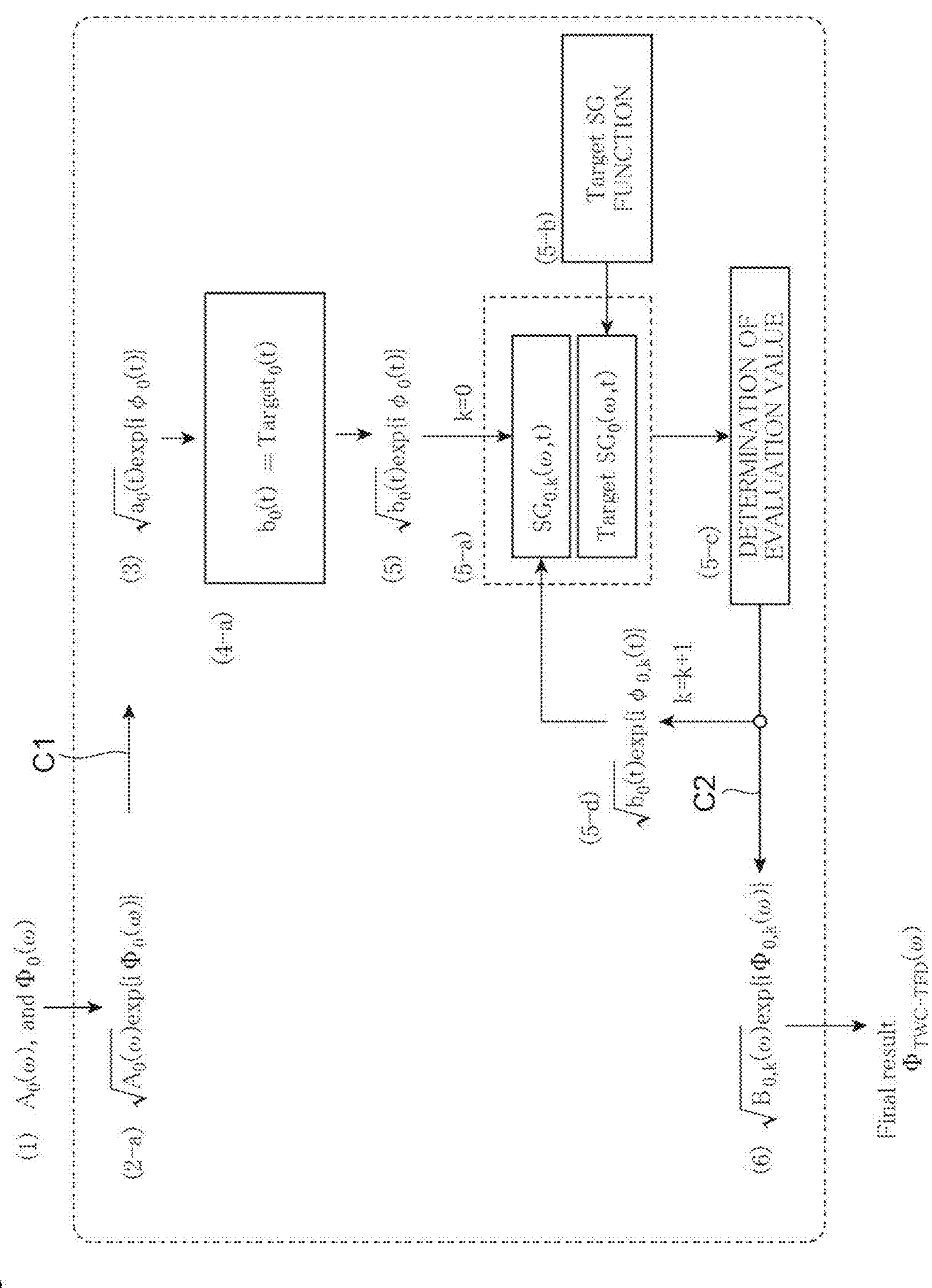
FIG. 28 is a diagram showing a procedure for calculating a phase spectrum function in the preliminary data generation unit.

FIG. 28 is a diagram showing a procedure for calculating the phase spectrum function in the preliminary data generation unit 40. First, the initial intensity spectrum function $A_0(\omega)$ and the initial phase spectrum function $\Phi_0(\omega)$, which are functions of the frequency $\omega$, are prepared (process number (1) in the diagram). For example, the initial intensity spectrum function $A_0(\omega)$ indicates the intensity spectrum of the first optical pulse Pa, but is not limited thereto. In addition, the initial phase spectrum function $\Phi_0(\omega)$ is sequentially selected from a plurality of initial phase spectrum functions $\Phi_0(\omega)$ stored in the storage unit 24, as in the embodiment described above.

Then, a first waveform function (7) in the frequency domain including the initial intensity spectrum function $A_0(\omega)$ and the initial phase spectrum function $\Phi_0(\omega)$ is prepared (process number (2-*a*)). Here, i is an imaginary number.

[Formula 7]

$$\sqrt{A_0(\omega)}\exp\{i\Phi_0(\omega)\} \tag{7}$$

Then, the Fourier transform unit 41 performs Fourier transform (arrow C1 in the diagram) from the frequency domain to the temporal domain on the function (7). As a result, a second waveform function (8) in the temporal domain including a temporal intensity waveform function $a_0(t)$ and a temporal phase waveform function $\phi_0(t)$ is obtained (Fourier transform step, process number (3) in the diagram).

[Formula 8]

$$\sqrt{a_0(t)}\exp\{i\phi_0(t)\} \tag{8}$$

Then, as shown in the following Formula (9), the function replacement unit 421 of the function transform unit 42 substitutes a temporal intensity waveform function $\text{Target}_0(t)$ indicating the target temporal waveform into a temporal intensity waveform function $b_0(t)$ (process number (4-*a*)).

[Formula 9]

$$b_0(t) = \text{Target}_0(t) \tag{9}$$

Then, as shown in the following Formula (10), the function replacement unit 421 of the function transform unit 42 replaces the temporal intensity waveform function $a_0(t)$ with the temporal intensity waveform function $b_0(t)$. That is, the temporal intensity waveform function $a_0(t)$ included in the above function (8) is replaced with the temporal intensity waveform function $Target_0(t)$ based on the target temporal waveform (function replacement step, process number (5) in the diagram).

[Formula 10]

$$\sqrt{b_0(t)}\exp\{i\phi_0(t)\} \tag{10}$$

Then, the waveform function modification unit 422 of the function transform unit 42 modifies the second waveform function so that the spectrogram of the replaced second waveform function (10) approaches a target spectrogram generated in advance according to the desired wavelength band. First, by subjecting the replaced second waveform function (10) to time-frequency transform, the second waveform function (10) is transformed into a spectrogram $SG_{0,k}(\omega, t)$ (process number (5-*a*) in the diagram). The subscript k indicates the k-th transform process.

In addition, a target spectrogram $TargetSG_0(\omega, t)$ generated in advance according to a desired wavelength band is read out from the target setting unit 45. The target spectrogram $TargetSG_0(\omega, t)$ has approximately the same value as the target temporal waveform (temporal intensity waveform and frequency components forming the temporal intensity waveform), and is generated in the target spectrogram function of process number (5-*b*).

Then, the waveform function modification unit 422 of the function transform unit 42 performs pattern matching between the spectrogram $SG_{0,k}(\omega, t)$ and the target spectrogram $TargetSG_0(\omega, t)$ to check the degree of similarity (how much these match each other). In the present embodiment, an evaluation value is calculated as an index indicating the degree of similarity. Then, in the subsequent process number (5-*c*), it is determined whether or not the obtained evaluation value satisfies predetermined end conditions. If the conditions are satisfied, the process proceeds to the process number (6), and if the conditions are not satisfied, the process proceeds to the process number (5-*d*). In the process number (5-*d*), the temporal phase waveform function $\phi_0(t)$ included in the second waveform function is changed to any temporal phase waveform function $\phi_{0,k}(t)$. The second waveform function after changing the temporal phase waveform function is transformed again into a spectrogram by time-frequency transform such as STFT. Thereafter, the process numbers (5-*a*) to (5-*c*) described above are repeated. In this manner, the second waveform function is modified such that the spectrogram $SG_{0,k}(\omega, t)$ gradually approaches the target spectrogram $TargetSG_0(\omega, t)$ (waveform function modification step).

Thereafter, the inverse Fourier transform unit 43 performs inverse Fourier transform (arrow C2 in the diagram) on the modified second waveform function to generate a third waveform function (11) in the frequency domain (inverse Fourier transform step, process number (6) in the diagram).

[Formula 11]

$$\sqrt{B_{0,k}(\omega)}\exp\{i\Phi_{0,k}(\omega)\} \tag{11}$$

The phase spectrum function $\Phi_{0,k}(\omega)$ included in the third waveform function (11) becomes a desired phase spectrum function $\Phi_{TWC\text{-}TFD}(\omega)$ finally obtained. This phase spectrum function $\Phi_{TWC\text{-}TFD}(\omega)$ is provided to the data generation unit 44.

The data generation unit 44 calculates a phase modulation pattern (for example, a computer-generated hologram) for applying the spectral phase indicated by the phase spectrum function $\Phi_{TWC\text{-}TFD}(\omega)$ to the first optical pulse Pa (data generation step).

Figure 29:
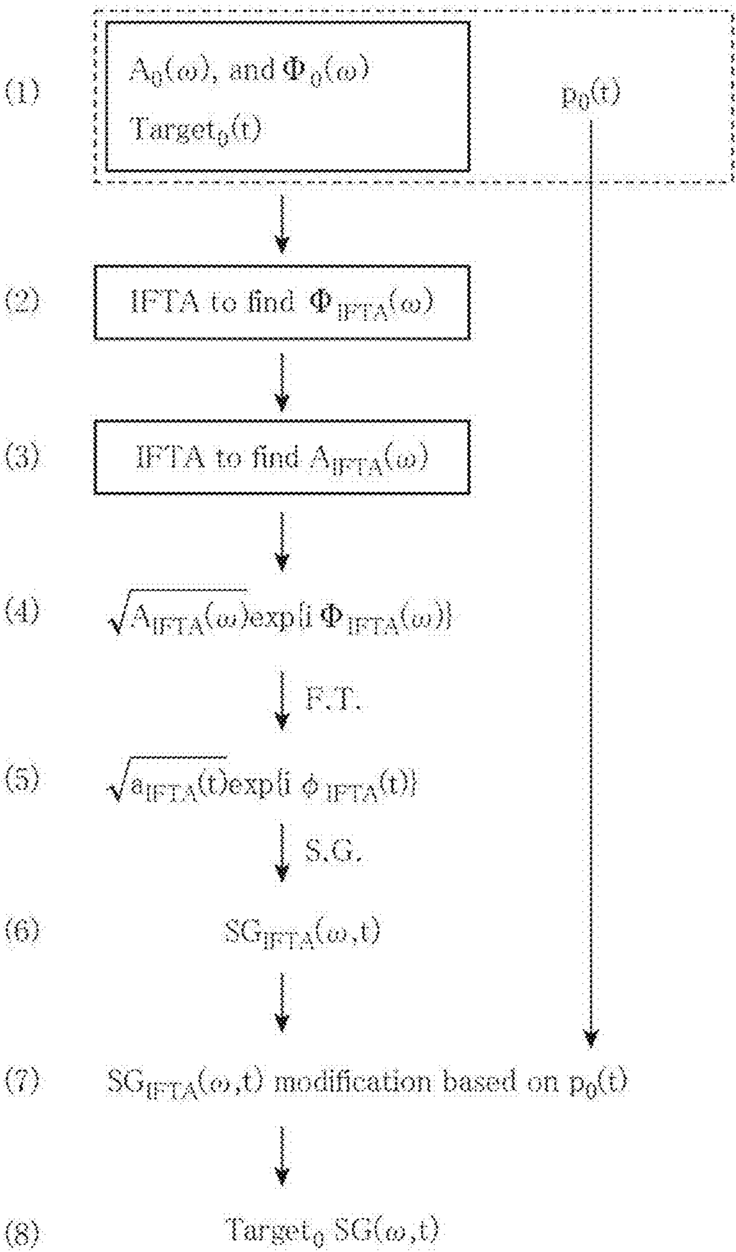
FIG. 29 is a diagram showing an example of a procedure for generating a target spectrogram in the target setting unit.

Here, FIG. 29 is a diagram showing an example of a procedure for generating the target spectrogram $TargetSG_0(\omega, t)$ in the target setting unit 45. Since the target spectrogram $TargetSG_0(\omega, t)$ indicates a target temporal waveform (temporal intensity waveform and frequency components (wavelength band components) forming the temporal intensity waveform), generating the target spectrogram is an extremely important step for controlling frequency components (wavelength band components). As shown in FIG. 29, the target setting unit 45 first inputs a spectral waveform (initial intensity spectrum function $A_0(\omega)$ and initial phase spectrum function $\Phi_0(\omega)$) and a desired temporal intensity waveform function $Target_0(t)$. In addition, a temporal function $p_0(t)$ including desired frequency (wavelength) band information is input (process number (1)).

Then, the target setting unit 45 calculates a phase spectrum function $\Phi_{IFTA}(\omega)$ for realizing the temporal intensity waveform function $Target_0(t)$ by using, for example, a general iterative Fourier transform method or the method described in Non Patent Literature 1 or 2 (process number (2)).

Figure 30:
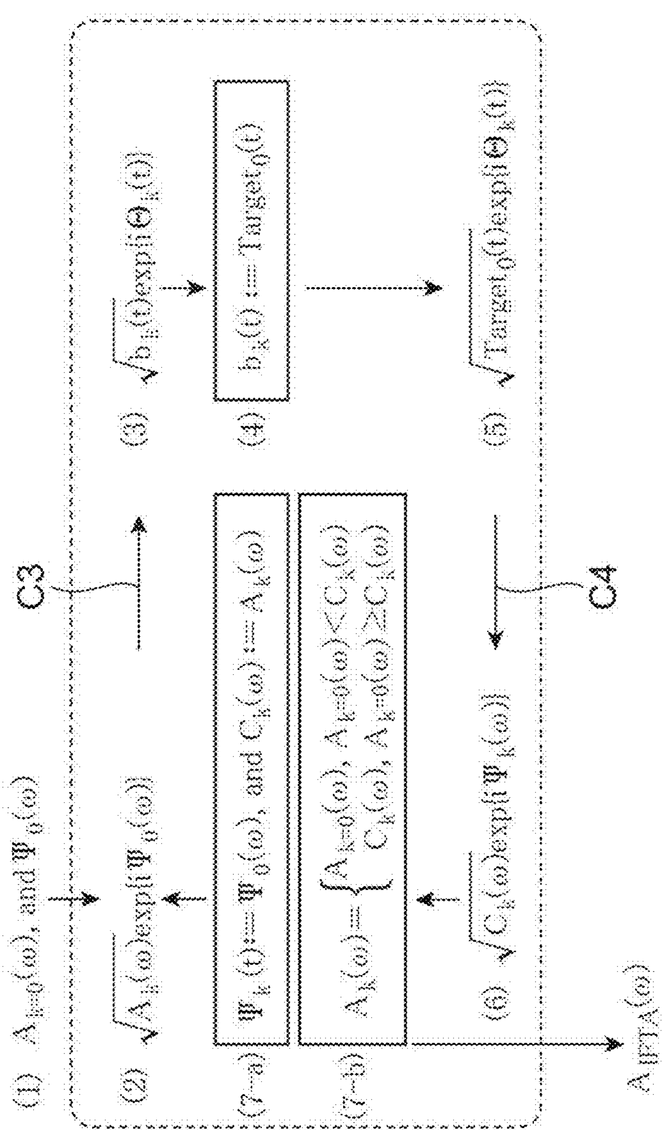
FIG. 30 is a diagram showing an example of a procedure for calculating an intensity spectrum function.

Then, the target setting unit 45 calculates $a_n$ intensity spectrum function $A_{IFTA}(W)$ for realizing the temporal intensity waveform function $Target_0(t)$ by using the iterative Fourier transform method using the previously obtained phase spectrum function $\Phi_{IFTA}(\omega)$ (process number (3)). Here, FIG. 30 is a diagram showing $a_n$ example of the procedure for calculating the intensity spectrum function $A_{IFTA}(\omega)$.

First, an initial intensity spectrum function $A_{k=0}(\omega)$ and a phase spectrum function $\Psi_0(\omega)$ are prepared (process number (1) in the diagram). Then, a waveform function (12) in the frequency domain including the intensity spectrum function $A_k(\omega)$ and the phase spectrum function $\Psi_0(\omega)$ is prepared (process number (2) in the diagram).

[Formula 12]

$$\sqrt{A_k(\omega)}\exp\{i\Psi_0(\omega)\} \tag{12}$$

The subscript k indicates after the k-th Fourier transform process. Before the first Fourier transform process, the above-described initial intensity spectrum function $A_{k=0}(\omega)$ is used as the intensity spectrum function $A_k(\omega)$. i is $a_n$ imaginary number.

Then, the above function (12) is subjected to Fourier transform (arrow C3 in the diagram) from the frequency domain to the temporal domain. As a result, a waveform function (13) in the frequency domain including a temporal intensity waveform function $b_k(t)$ is obtained (process number (3) in the diagram).

[Formula 13]

$$\sqrt{b_k(t)}\exp\{i\Theta_k(t)\} \tag{13}$$

Then, the temporal intensity waveform function $b_k(t)$ included in the above function (13) is replaced with the temporal intensity waveform function $\mathrm{Target}_0(t)$ based on a desired waveform (process numbers (4) and (5) in the diagram).

[Formula 14]

$$b_k(t) := \mathrm{Target}_0(t) \tag{14}$$

[Formula 15]

$$\sqrt{\mathrm{Target}_0(\tau)}\exp\{i\Theta_k(t)\} \tag{15}$$

Then, the above function (15) is subjected to inverse Fourier transform (arrow C4 in the diagram) from the temporal domain to the frequency domain. As a result, a waveform function (16) in the frequency domain including an intensity spectrum function $C_k(\omega)$ and a phase spectrum function $\Psi_k(\omega)$ is obtained (process number (6) in the diagram).

[Formula 16]

$$\sqrt{C_k(\omega)}\exp\{i\Psi_k(\omega)\} \tag{16}$$

Then, in order to constrain the phase spectrum function $\Psi_k(\omega)$ included in the above function (16), the phase spectrum function $\Psi_k(\omega)$ is replaced with the initial phase spectrum function $\Psi_0(\omega)$ (process number (7-*a*) in the diagram).

[Formula 17]

$$\Psi_k(\omega) := \Psi_0(\omega) \tag{17}$$

In addition, the intensity spectrum function $C_k(\omega)$ in the frequency domain after the inverse Fourier transform is subjected to filtering processing based on the intensity spectrum of the first optical pulse Pa. Specifically, of the intensity spectrum expressed by the intensity spectrum function $C_k(\omega)$, a portion exceeding the cutoff intensity for each wavelength determined based on the intensity spectrum of the first optical pulse Pa is cut. For example, the cutoff intensity for each wavelength is set to match the intensity spectrum (for example, the initial intensity spectrum function $A_{k=0}(\omega)$) of the first optical pulse Pa. In this case, as expressed in the following Formula (18), at frequencies where the intensity spectrum function $C_k(\omega)$ is larger than the intensity spectrum function $A_{k=0}(\omega)$, the value of the intensity spectrum function $A_{k=0}(\omega)$ is taken as the value of the intensity spectrum function $A_k(\omega)$. In addition, at frequencies where the intensity spectrum function $C_k(\omega)$ is equal to or less than the intensity spectrum function $A_{k=0}(\omega)$, the value of the intensity spectrum function $C_k(\omega)$ is taken as the value of the intensity spectrum function $A_k(\omega)$ (process number (7-*b*) in the diagram).

[Formula 18]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \tag{18}$$

The intensity spectrum function $C_k(\omega)$ included in the above function (16) is replaced with the intensity spectrum function $A_k(\omega)$ after the filtering processing according to the above Formula (18).

Then, by repeating the above processes (1) to (7-*b*), the intensity spectrum shape indicated by the intensity spectrum function $A_k(\omega)$ in the waveform function can be approximated to the intensity spectrum shape corresponding to the desired temporal intensity waveform. Finally, the intensity spectrum function $A_{IFTA}(\omega)$ is obtained.

FIG. 29 is referred to again. By calculating the phase spectrum function $\Phi_{IFTA}(\omega)$ and the intensity spectrum function $A_{IFTA}(\omega)$ in the process numbers (2) and (3) described above, a third waveform function (19) in the frequency domain including these functions is obtained (process number (4) in the diagram).

[Formula 19]

$$\sqrt{A_{IFTA}(\omega)}\exp\{i\Phi_{IFTA}(\omega)\} \tag{19}$$

The Fourier transform unit 451 of the target setting unit 45 performs Fourier transform on the above waveform function (19). As a result, a fourth waveform function (20) in the temporal domain is obtained (process number (5) in the diagram).

[Formula 20]

$$\sqrt{a_{IFTA}(t)}\exp\{i\phi_{IFTA}(t)\} \tag{20}$$

The spectrogram modification unit 452 of the target setting unit 45 transforms the fourth waveform function (20) into a spectrogram $SG_{IFTA}(\omega, t)$ by time-frequency transform (process number (6)). Then, in the process number (7), by modifying the spectrogram $SG_{IFTA}(\omega, t)$ based on the temporal function $p_0(t)$ including the desired frequency (wavelength) band information, the target spectrogram $\mathrm{TargetSG}_0(\omega, t)$ is generated. For example, a characteristic pattern appearing in the spectrogram $SG_{IFTA}(\omega, t)$ configured by two-dimensional data is partially cut out, and the frequency component of the portion is manipulated based on the temporal function $p_0(t)$. Hereinafter, a specific example thereof will be described in detail.

For example, a case is considered in which triple pulses having a time interval of 2 picoseconds are set as the desired temporal intensity waveform function $\mathrm{Target}_0(t)$. At this time, the resulting spectrogram $SG_{IFTA}(\omega, t)$ is shown in FIG. 7A. If it is desired to control only the temporal intensity waveform of the optical pulse train Pb (it is desired to simply obtain triple pulses), there is no need to manipulate the wavelength band of the optical pulses $Pb_1$, $Pb_2$, $Pb_3$ included in the spectrogram $SG_{IFTA}(\omega, t)$. However, if it is desired to control the wavelength band of each pulse, it is necessary to manipulate the optical pulses $Pb_1$, $Pb_2$, and $Pb_3$. That is, as shown in FIG. 6A, the optical pulses $Pb_1$, $Pb_2$, and $Pb_3$ are moved independently from each other in a direction along the wavelength axis (vertical axis). Such a change in the wavelength band of each pulse is performed based on the temporal function $p_0(t)$.

For example, when writing the temporal function $p_0(t)$ so that the peak wavelength of the optical pulse $Pb_2$ is fixed at 800 nm and the peak wavelengths of the optical pulses $Pb_1$ and $Pb_3$ are translated by −2 nm and +2 nm, respectively, the spectrogram $SG_{IFTA}(\omega, t)$ changes to the target spectrogram $TargetSG_0(\omega, t)$ shown in FIG. 6A. For example, by subjecting the spectrogram to such processing, it is possible to generate a target spectrogram in which the wavelength band of each pulse is arbitrarily controlled without changing the shape of the temporal intensity waveform.

The optical pulse train generation device and the optical pulse train generation method according to the present disclosure are not limited to the embodiment described above, and various other modifications can be made. For example, the first characteristic regarding the first optical pulse Pa is not limited to those exemplified in the above embodiment, and may include various other characteristics regarding the first optical pulse Pa. Similarly, the second characteristic regarding the optical pulse train Pb is not limited to those exemplified in the above embodiment, and may include various other characteristics regarding the optical pulse train Pb.

In addition, although the data providing unit 20 includes the spectrogram setting unit 22 and the phase pattern generation unit 23 in the above embodiment, the data providing unit 20 may not include the spectrogram setting unit 22 and the phase pattern generation unit 23. In this case, a plurality of phase patterns generated by the spectrogram setting unit 22 and the phase pattern generation unit 23 prepared separately from the data providing unit 20 may be stored in the storage unit 24. Alternatively, the plurality of phase patterns stored in the storage unit 24 may be those generated in the preparation step ST1 of the above embodiment.

What is claimed is:

1. An optical pulse train generation device, comprising:

a storage unit that stores in advance a plurality of phase patterns for forming, from a first optical pulse, an optical pulse train including a plurality of second optical pulses having time differences therebetween and having different center wavelengths, the plurality of phase patterns having different first characteristics regarding the first optical pulse or different second characteristics regarding the optical pulse train or having both of the different first characteristics and the different second characteristics;

a characteristic setting unit that sets the first characteristic and the second characteristic in response to an input from a user;

a light source that outputs the first optical pulse; and a pulse forming unit that has a spatial light modulator that displays one of the plurality of phase patterns and forms the optical pulse train from the first optical pulse, wherein the storage unit stores the plurality of phase patterns in association with the first characteristic and the second characteristic, and the spatial light modulator displays, among the plurality of phase patterns, one phase pattern corresponding to the first characteristic and the second characteristic set by the characteristic setting unit.

2. The optical pulse train generation device according to claim 1, wherein the first characteristic includes at least one characteristic selected from a group consisting of a center wavelength of the first optical pulse, a bandwidth of the first optical pulse, a spectral shape of the first optical pulse, a spectral phase of the first optical pulse, and a type of the light source.

3. The optical pulse train generation device according to claim 1, wherein the second characteristic includes at least one characteristic selected from a group consisting of number of the plurality of second optical pulses, a time interval between the plurality of second optical pulses, a variation in time interval between the plurality of second optical pulses, a center wavelength of each of the plurality of second optical pulses, a center wavelength difference between the plurality of second optical pulses, a bandwidth of each of the plurality of second optical pulses, a variation in a bandwidth of each of the plurality of second optical pulses, a peak intensity ratio between the plurality of second optical pulses, and a variation in peak intensity between the plurality of second optical pulses.

4. The optical pulse train generation device according to claim 1, wherein the storage unit stores a plurality of phase pattern groups, each of the plurality of phase pattern groups includes two or more phase patterns that are parts of the plurality of phase patterns, and has a one-to-one correspondence with each of two or more index values regarding the second characteristic, the characteristic setting unit has a presentation unit that presents, to the user, the second characteristic of the optical pulse train obtained by each phase pattern of a phase pattern group, included in the plurality of phase pattern groups, corresponding to one index value selected by the user's input among the two or more index values, and the spatial light modulator displays a phase pattern corresponding to one second characteristic selected by the user among the second characteristics presented by the presentation unit.

5. The optical pulse train generation device according to claim 1, further comprising:

a phase pattern generation unit that generates the plurality of phase patterns, wherein the phase pattern generation unit includes:

a first transform unit that transforms a first waveform function in a frequency domain into a second waveform function in a temporal domain, the first waveform function including an intensity spectrum function and a phase spectrum function, the second waveform function including a temporal intensity waveform function and a temporal phase waveform function;

a second transform unit that calculates a third waveform function in the temporal domain from the second waveform function, the third waveform function including a temporal intensity waveform function and a temporal phase waveform function and corresponding to a target intensity spectrogram generated in advance; and a third transform unit that transforms the third waveform function into a fourth waveform function in the frequency domain, the fourth waveform function including an intensity spectrum function and a phase spectrum function, and the phase pattern generation unit repeatedly performs operations of the first transform unit, the second transform unit, and the third transform unit for each of the plurality of phase patterns while replacing the first waveform function with the fourth waveform function, and generates each of the plurality of phase patterns based on the phase spectrum function of the fourth waveform function obtained after repeated operations.

6. The optical pulse train generation device according to claim 5, wherein the second transform unit includes:

a unit that transforms the second waveform function into an intensity spectrogram and a phase spectrogram;

a unit that replaces the intensity spectrogram with the target intensity spectrogram and constrains the phase spectrogram; and a unit that transforms replaced intensity spectrogram and constrained phase spectrogram into the third waveform function.

7. The optical pulse train generation device according to claim 5, wherein the second transform unit includes:

a unit that performs, for the second waveform function, replacement of the temporal intensity waveform function based on a target waveform corresponding to the target intensity spectrogram;

a unit that modifies the second waveform function so that a spectrogram of the second waveform function approaches the target intensity spectrogram; and a unit that generates the third waveform function from modified second waveform function.

8. The optical pulse train generation device according to claim 1, wherein a first transform step for transforming a first waveform function in a frequency domain including an intensity spectrum function and a phase spectrum function into a second waveform function in a temporal domain including a temporal intensity waveform function and a temporal phase waveform function, a second transform step for calculating, from the second waveform function, a third waveform function in the temporal domain that includes a temporal intensity waveform function and a temporal phase waveform function and corresponds to a target intensity spectrogram generated in advance, and a third transform step for transforming the third waveform function into a fourth waveform function in the frequency domain including an intensity spectrum function and a phase spectrum function are repeatedly performed while replacing the first waveform function with the fourth waveform function, and the plurality of phase patterns are generated based on the phase spectrum function of the fourth waveform function obtained after repeated operations.

9. An optical pulse train generation method, comprising:

preparing in advance a plurality of phase patterns for forming, from a first optical pulse, an optical pulse train including a plurality of second optical pulses having time differences therebetween and having different center wavelengths, the plurality of phase patterns having different first characteristics regarding the first optical pulse or different second characteristics regarding the optical pulse train or having both of the different first characteristics and the different second characteristics;

setting the first characteristic and the second characteristic in response to an input from a user;

outputting the first optical pulse; and forming the optical pulse train from the first optical pulse by using a spatial light modulator that displays one of the plurality of phase patterns, wherein, in the preparing, the plurality of phase patterns are prepared in association with the first characteristic and the second characteristic, and in the forming, one phase pattern corresponding to the first characteristic and the second characteristic set in the setting, among the plurality of phase patterns, is displayed on the spatial light modulator.

10. The optical pulse train generation method according to claim 9, wherein the first characteristic includes at least one characteristic selected from a group consisting of a center wavelength of the first optical pulse, a bandwidth of the first optical pulse, a spectral shape of the first optical pulse, a spectral phase of the first optical pulse, and a type of light source used in the outputting.

11. The optical pulse train generation method according to claim 9, wherein the second characteristic includes at least one characteristic selected from a group consisting of number of the plurality of second optical pulses, a time interval between the plurality of second optical pulses, a variation in time interval between the plurality of second optical pulses, a center wavelength of each of the plurality of second optical pulses, a center wavelength difference between the plurality of second optical pulses, a bandwidth of each of the plurality of second optical pulses, a variation in a bandwidth of each of the plurality of second optical pulses, a peak intensity ratio between the plurality of second optical pulses, and a variation in peak intensity between the plurality of second optical pulses.

12. The optical pulse train generation method according to claim 9, wherein, in the preparing, a plurality of phase pattern groups are prepared, each of the plurality of phase pattern groups includes two or more phase patterns that are parts of the plurality of phase patterns, and has a one-to-one correspondence with each of two or more index values regarding the second characteristic, the setting includes presenting, to the user, the second characteristic of the optical pulse train obtained by each phase pattern of a phase pattern group, included in the plurality of phase pattern groups, corresponding to one index value selected by the user's input among the two or more index values, and in the forming, a phase pattern corresponding to one second characteristic selected by the user among the second characteristics presented in the presenting is displayed on the spatial light modulator.

13. The optical pulse train generation method according to claim 9, wherein the preparing includes:

transforming a first waveform function in a frequency domain including an intensity spectrum function and a phase spectrum function into a second waveform function in a temporal domain including a temporal intensity waveform function and a temporal phase waveform function;

calculating, from the second waveform function, a third waveform function in the temporal domain that includes a temporal intensity waveform function and a temporal phase waveform function and corresponds to a target intensity spectrogram generated in advance; and transforming the third waveform function into a fourth waveform function in the frequency domain including an intensity spectrum function and a phase spectrum function, and the transforming the first waveform function, the calculating, and the transforming the third waveform function are repeatedly performed in the preparing for each of the plurality of phase patterns while replacing the first waveform function with the fourth waveform function, and each of the plurality of phase patterns is generated based on the phase spectrum function of the fourth waveform function obtained after the repeated operations.

14. The optical pulse train generation method according to claim 13, wherein the transforming the third waveform function includes:

transforming the second waveform function into an intensity spectrogram and a phase spectrogram;

replacing the intensity spectrogram with the target intensity spectrogram and constraining the phase spectrogram; and transforming replaced intensity spectrogram and constrained phase spectrogram into the third waveform function.

15. The optical pulse train generation method according to claim 13, wherein the transforming the third waveform function includes:

performing, for the second waveform function, replacement of the temporal intensity waveform function based on a target waveform corresponding to the target intensity spectrogram;

modifying the second waveform function so that a spectrogram of the second waveform function approaches the target intensity spectrogram; and generating the third waveform function from modified second waveform function.

* * * * *